United States Patent [19]

Hancock et al.

[11] Patent Number: 4,995,159
[45] Date of Patent: Feb. 26, 1991

[54] METHOD OF MAKING AN ELECTRONICALLY COMMUTATED RELUCTANCE MOTOR

[75] Inventors: Clyde J. Hancock, Loves Park; James R. Hendershot, Rockford, both of Ill.

[73] Assignee: Pacific Scientific Company, Newport Beach, Calif.

[21] Appl. No.: 452,513

[22] Filed: Dec. 19, 1989

Related U.S. Application Data

[60] Division of Ser. No. 329,777, Mar. 28, 1989, which is a continuation-in-part of Ser. No. 232,436, Aug. 15, 1988, Pat. No. 4,883,999.

[51] Int. Cl.$^5$ ............................................. H02K 15/02
[52] U.S. Cl. ...................................... 29/596; 29/606; 29/609; 310/42; 310/43
[58] Field of Search ........................ 29/596, 606, 609; 310/42, 43, 216, 217

[56] References Cited

U.S. PATENT DOCUMENTS

| | | | |
|---|---|---|---|
| 3,483,613 | 12/1969 | Malcolm et al. | 29/596 |
| 3,802,066 | 4/1974 | Barrett | 29/596 |
| 4,080,724 | 3/1978 | Gillette | 29/609 |
| 4,102,040 | 2/1979 | Rich | 29/596 X |

Primary Examiner—Carl E. Hall
Attorney, Agent, or Firm—Leydig, Voit & Mayer

[57] ABSTRACT

A Motor structure and energization scheme provides a high efficiency electronically commutated reluctance motor that is characterized by less iron losses than conventional switched reluctance motors. The motor operates without the reversal of the flow of flux in the stator. Also, the flux switching frequency in the stator is minimized. By eliminating flux reversals and minimizing the flux switching frequency, the electronically commutated reluctance motor is operable over a wide range of speeds with improved efficiency. Structurally, the stator includes unevenly spaced poles which are grouped into pairs separated by a space related to the even spacing of the poles on the rotor. Adjacent pairs of poles on the stator are separated by a spacing which is not equal to the spacing between the poles of a pair. To provide for rotation of the rotor, each pair of poles on the stator is polarized to form poles of opposite polarity such that a magnetic circuit joins the two adjacent poles of the pair. Magnetic circuits linking different pairs of stator poles, which are the source flux reversals and high switching frequencies in conventional motors, are prevented by providing a stator construction that is without low reluctance paths between adjacent pairs of stator poles.

4 Claims, 12 Drawing Sheets

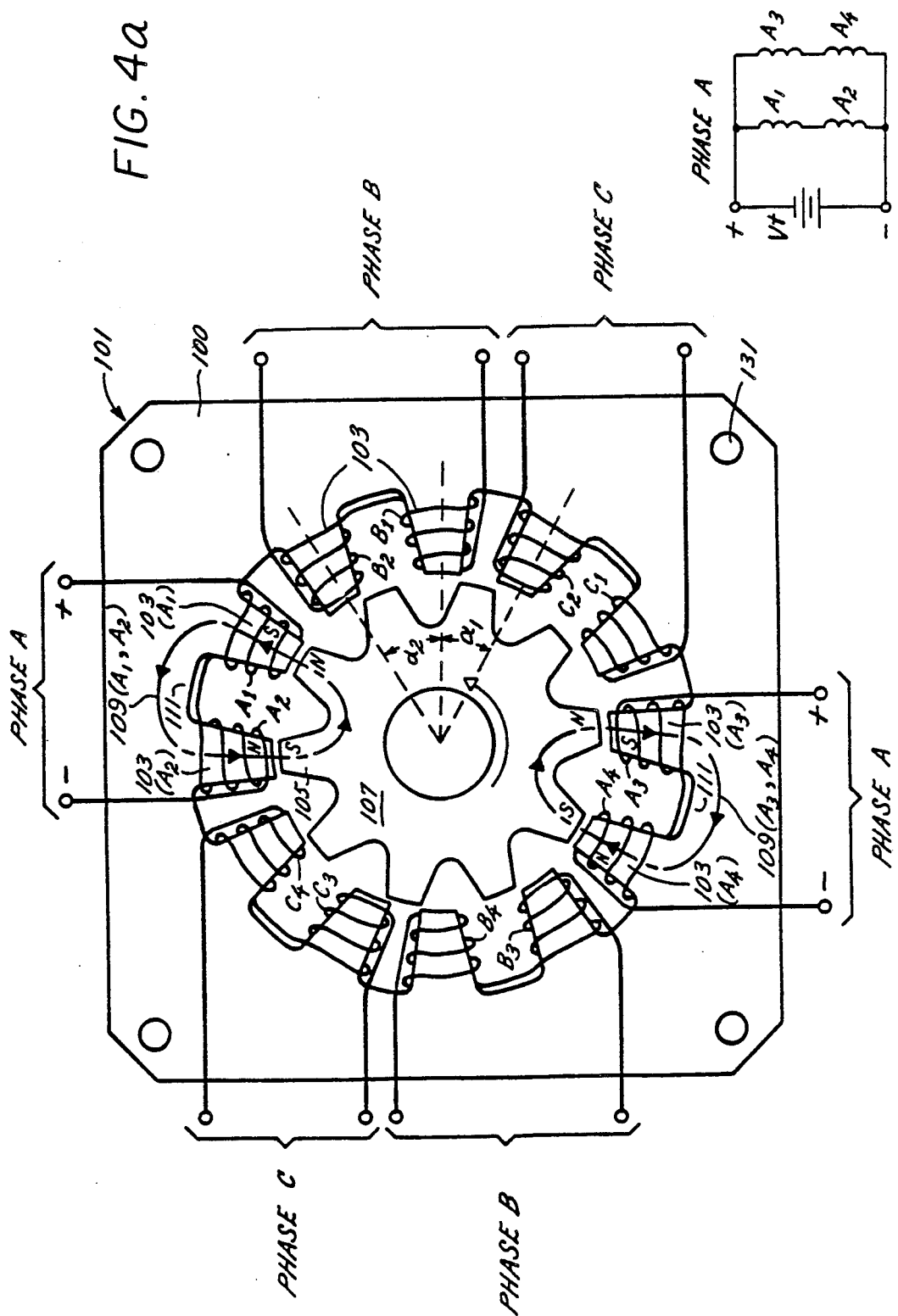

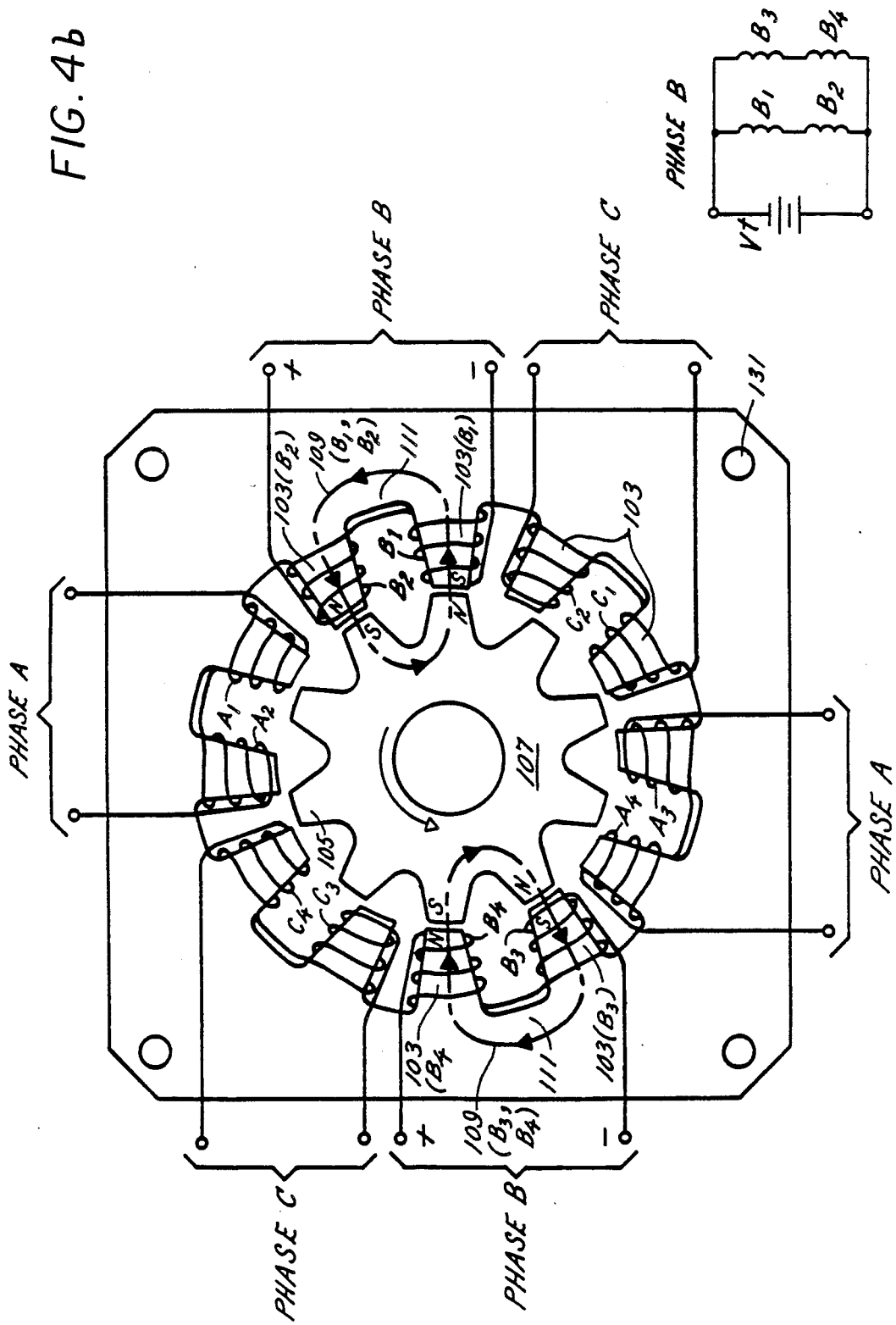

(PHASES CA)

METHOD OF MAKING AN ELECTRONICALLY COMMUTATED RELUCTANCE MOTOR

This is a division of application Ser. No. 329,777, filed Mar. 28, 1989, wich is a continuation-in-part of U.S. Ser. No. 232,436 filed 8/15/88, now U.S. Pat. No. 4,883,999.

FIELD OF THE INVENTION

The invention generally relates to electronically commutated reluctance motors and more particularly to electronically commutated reluctance motors operated as continuously rotating variable-speed drives.

BACKGROUND OF THE INVENTION

The basic characteristics of electronically commutated reluctance motors operated as continuously rotating variable-speed drives are well known, since they are members of the class of variable reluctance motors, commonly used in stepper motor applications. As variable-speed drives, electronically commutated reluctance motors are designed for efficient power conversion rather than for particular torque or control characteristics typically required in stepper motor applications, and the pole geometry and control strategies differ accordingly. For example, the number of rotor teeth is relatively small in an electronically commutated reluctance motor (cf., variable reluctance stepper motors), giving a large step angle, and the conduction angle is, generally, modulated as a function of both speed and torque to optimize operation as a variable-speed drive. As a term of art, these variable-speed reluctance motors are generally known as switched reluctance motors.

Because of recent developments in power semiconductor devices such as power MOSFETs and insulated gate thyristors (IGTs), switched reluctance motors have gained attention relative to other types of motors suitable for variable-speed drive applications. This increased attention derives from the fact that switched reluctance motors compare very favorably with other types of motors typically used as variable-speed drives. For example, the speed versus average torque curves for switched reluctance motors are very similar to the curves for brushless permanent magnet (PM) motors— e.g., the curves are fairly linear with no discontinuities of torque. Additionally, switched reluctance motors are the cheapest type of motor to manufacture. They are rugged and robust and therefore well suited for heavy duty use. They have excellent heat dissipation qualities, and they do not require brushes or slip rings. The drive circuits for switched reluctance motors are the simplest and lowest cost compared to drives for other motors. Moreover, using state-of-the-art semiconductor technology for controllers, the efficiency of switched reluctance motors compares very favorably with other classes of variable-speed motors such as inverter-driven AC motor and PM motors.

Although the foregoing comparative features are favorable, switched reluctance motors are also known to have several disadvantages which are common to all variable-speed drive motors. Specifically, copper, hysteresis and eddy current losses limit motor efficiency, especially at relatively high RPMs.

A recent advance in the design of switched reluctance motors described in U.S. patent application No. 232,436 has significantly improved performance characteristics of such motors, especially at higher RPMs (e.g., 10,000 and up). Unique structural and excitation features of this motor significantly reduce hysteresis and eddy current losses relative to conventional switched reluctance motors. Electronically commutated reluctance motors as illustrated in the '436 application are hereinafter referred to as ECR motors. These ECR motors are typically characterized by a stator and rotor mounted for relative rotation wherein the rotor has evenly spaced teeth and the stator has unevenly spaced poles such that when the poles of the stator are energized by a single phase of a power source, they define pairs of adjacent poles, with the poles of each pair having opposite polarities. In the embodiments of the ECR motor illustrated in the '436 application, the stator is a stack of laminations, where each lamination is a plurality of poles supported on a yoke as is conventional in the art of motor design. Windings are wrapped about the poles of the stator in a manner which allows each phase of a power source to energize pairs of adjacent poles having opposite polarities so as to create a magnetic circuit between each of the pole pairs. Both poles of a pair are always excited together in any energization scheme utilized to drive the ECR motor, thereby ensuring the primary magnetic circuit formed by the pair is through the back iron area of the stator yoke bridging the poles of the pair.

When more than one pair of adjacent stator teeth are energized at a time using a unipolar drive, "secondary magnetic circuits" are created linking two pairs of stator teeth by way of a flux path that crosses the "primary magnetic circuit" of unenergized pairs of stator teeth (a primary magnetic circuit is the magnetic circuit between poles of a pair). These secondary magnetic circuits are formed in part by the continuous back iron or yoke of the stator, and they effectively increase the flux switching frequency for those portions of the stator back iron where primary and secondary circuits overlap. Depending upon the mode of excitation and the particular configuration of the ECR motor, these secondary circuits may have little or great effect on the performance characteristics of the ECR motor.

To prevent the occurrence of such secondary magnetic circuits linking pairs of stator teeth, a bipolar drive may be substituted for the unipolar drive in order to control the relative polarities of simultaneously polarized pairs in a relationship such that neighboring poles separated by an unenergized pair or pairs of poles are of the same polarity. The use of bipolar drives with an ECR motor, however, increases the system cost relative to conventional switch reluctance motors using unipolar drives. The increased efficiency provided by an ECR motor is significant relative to a switch reluctance motor and, on an objective basis, the use of a bipolar drive should not deter a designer from choosing an ECR motor for a variable-speed application. Nevertheless, it would be desirable to provide a design for an ECR motor that realizes the full efficiency available from such a motor without the need for a bipolar drive when the motor is driven by certain energization schemes.

A related cost comparison between ECR motors and conventional switched reluctance motors is the cost of manufacturing. Assuming the use of similar manufacturing techniques, ECR and conventional switched reluctance motors cost approximately the same to produce. One of the major expenses of manufacturing either type of motor is the cost of preparing windings for the stator lamination stack. The windings must be placed over the stator poles which extend inwardly from the generally cylindrical surface formed by the stack. The relatively small inner diameter of the stator makes the production of windings a difficult task which requires expensive machinery for high volume production or expensive hand labor if volume demand is less. To complement the superior performance characteristics of an ECR motor, it would be desirable to provide for construction of an ECR motor which is inherently less expensive to manufacture than conventional switched reluctance motors.

SUMMARY OF THE INVENTION

It is a primary object of the invention to provide an ECR motor which fully realizes its efficiency potential without the need of a bipolar drive, regardless of the excitation scheme employed.

It is also a primary object of the invention to provide an ECR motor whose manufacturing costs are significantly less than those of conventional switched reluctance motors.

It is a further object of the invention to provide an ECR motor having an improved cooling ability, thereby allowing the motor to be rated for operation at higher power levels.

Other objects and advantages of the invention will be apparent from the following detailed description and the accompanying drawings.

Briefly, the invention provides an ECR motor having magnetically coupled pairs of adjacent stator poles which are each magnetically isolated from other stator pole pairs. To magnetically isolate each stator pole pair, high reluctance medium separates these adjacent pairs of stator poles. By providing a high reluctance medium between adjacent pairs of stator poles, magnetic flux generated by the energization of a pole pair is substantially confined to the primary magnetic circuit joining the pair and secondary magnetic circuits are prevented which otherwise may be generated when an ECR motor is excited by more than one phase at a time using a unipolar drive. Incorporating the invention into an ECR motor allows unipolar drives to be used for all excitation schemes without generating secondary magnetic circuits which reduce operating efficiency.

By ensuring the primary magnetic circuit formed by either pole in a pair is between the poles of the pair, flux reversals in the stator which reduce efficiency are eliminated. Furthermore, switching frequency of the flux in any area of the stator is equal to the switching frequency of each phase. In contrast to the foregoing, the switching frequency of the flux in the back iron area of conventional switched reluctance motors is typically three times the switching frequency of each phase. The reversal of flux flow and the switching frequency of the flux in the back iron is related to the extent of hysteresis and eddy current losses in the motor. By reducing the switching frequency of the flux and eliminating flux reversals, eddy current and hysteresis losses are significantly reduced.

In a preferred embodiment, stator poles of each pair are formed by a stack of U-shaped laminations of highly permeable steel. Each leg of the U-shaped stack defines one of the poles of the pair. Magnetic flux is guided between the poles by the foot of the U-shaped stack which defines a back iron region of high permeability. A plurality of these U-shaped stacks are arranged to form a stator and are held in relative alignment by end bells in the same way conventional stator laminations are stacked and held together. Each stack is circumferentially spaced from an adjacent stack by an air gap such that the space or angle between adjacent stacks is not equal to the space or angle between poles of a pair. The space or angle between poles of a pair are such that the pair of poles can simultaneously be brought into radial alignment with the poles of the rotor.

Because each pole pair is formed from a U-shaped stack of lamination, the poles are accessible for easy assembly of the windings. Unlike conventional stator poles referenced to a yoke which requires winding of the coils in the interior of an assembled stator, each U-shaped stack can be wound before the stacks are configured into a stator. By providing for the winding of stator coils into the poles before assembly of the stator, substantial labor costs can be saved (if hand wound).

After the stator is assembled, the space between adjacent pole pairs can remain open or be filled in with a non-magnetic material such as, for example, an epoxy resin. In either case, the motor exhibits an increased ability to cool which allows the motor to effectively have a higher horsepower rating than a similar motor having a conventional stator yoke.

BRIEF DESCRIPTION OF THE DRAWINGS

FIGS. 4a–4c are a schematic cross-sectional views of a three-phase ECR motor without the improvement of the invention wherein two pairs of stator poles are energized per phase in a one-phase-on energization scheme;

While the invention will be described in connection with several alternative embodiments, there is no intent to limit the invention to those embodiments. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
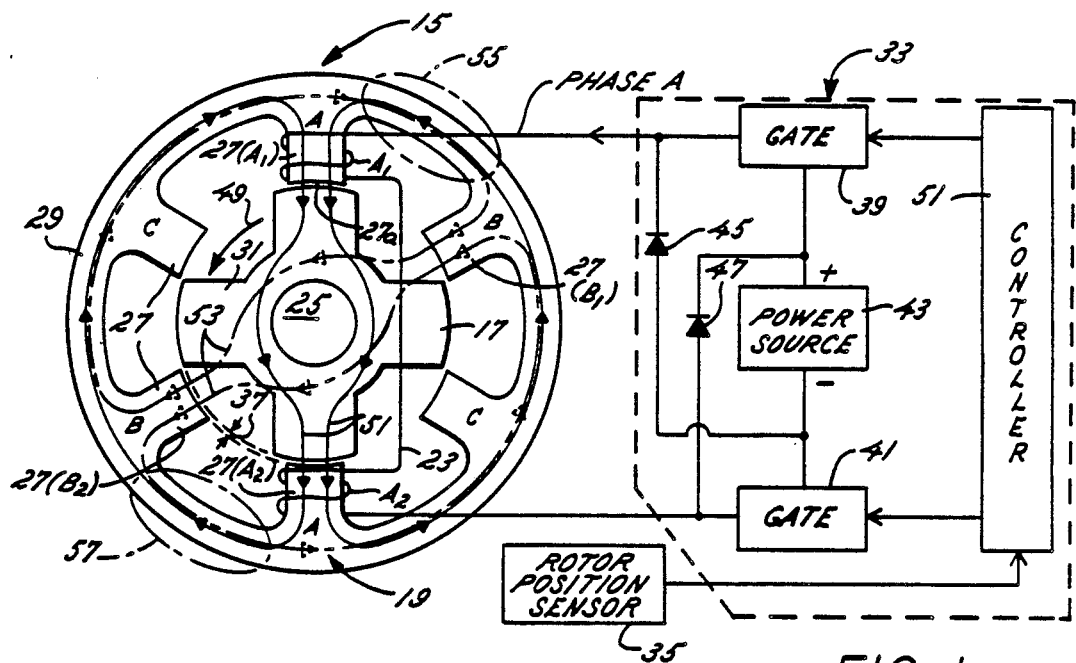
FIG. 1 is a schematic cross-sectional view of a conventional switched reluctance motor construction, illustrated in a six stator pole and four rotor pole configuration.

Turning to the drawings and referring first to FIG. 1, a typical three-phase, prior art switched reluctance motor 15 is characterized by a rotor 17 without windings, permanent magnets or a commutator. Because the rotor 17 is without windings or permanent magnets, the rotor has a low inertia compared to AC or PM motors. A stator 19 is characterized by a relatively small number of copper phase windings (only one pair of series connected windings $A_1$ and $A_2$ is shown) and with very short end windings 23—a significant advantage over AC or PM motors which increases the efficiency of switched reluctance motors.

The rotor 17 which rotates about a steel shaft 25 is simply a stack of laminations comprising a magnetically permeable steel alloy. As suggested by FIG. 1, each rotor lamination is cut to form a number of salient poles which extend radially outwardly from the axis of rotor rotation and are circumferentially evenly spaced about the periphery of the rotor 17.

As with the rotor 17, the stator 19 is preferably formed by a stack of laminations made from a magnetically permeable steel alloy. In order to cause rotation of the rotor 17 as explained hereafter, the stator includes a number of salient poles 27 which is unequal to the number of salient poles 31 on the rotor 17. The stator poles 27 extend radially inwardly from an annular yoke 29 and are circumferentially and evenly spaced about the yoke.

The switched reluctance motor of FIG. 1 has six stator poles 27 and four rotor poles 31. Windings on diametrically opposite stator poles 27 are connected in series to form phases—three in this case (A, B and C). For ease of illustration, winding pairs B and C are not shown in FIG. 1; instead, the stator poles associated with these windings are labeled "B" or "C" accordingly. As those familiar with switched reluctance motors will appreciate, different combinations of the numbers of stator and rotor poles may be used—for example, an eight stator pole and six rotor pole combination will give a four-phase machine with a nominal 15° angle of rotor rotation for each commutated phase. The six stator pole and four rotor pole motor shown in FIG. 1 has a step angle of 30°. For identification of particular stator poles 27, reference hereinafter will be made to the stator pole and its winding—e.g., in FIG. 1 the stator poles of phase A are 27 ($A_1$) and 27 ($A_2$), where $A_1$ and $A_2$ comprise the winding pair for phase A.

The excitation of windings $A_1$ and $A_2$ of phase A magnetizes both the stator 19 and the rotor 17. As illustrated, this excitation produces a torque causing the rotor 17 to align its poles 31 with the excited stator poles 27 ($A_1$) and 27 ($A_2$). The polarity of the torque does not depend on the polarity of the current since the rotor 17 is always attracted to the stator 19 and will rotate to an orientation which provides a minimum reluctance path between energized poles. Consequently, the switched reluctance motor requires only unipolar current through the phase windings and from a drive generally indicated as 33 in FIG. 1. Sequential excitation of the phase windings A, B and C provides a "one-phase-on" operation which causes the rotor 17 to rotate and synchronously align the poles 31 of the rotor with those excited on the stator 19. In a conventional manner, a shaft position sensor 35 provides to the drive 33 the rotor position information necessary for synchronization of the rotor rotation and phase excitation.

Torque in the switched reluctance motor is proportional to the rate of increase of flux carried by the rotor and stator poles 31 and 27, respectively, as they rotate into alignment. Both air-gap reluctance and pole reluctance simultaneously decrease as the rotor 17 rotates into a position that is radially aligned with the energized stator poles 27 ($A_1$) and 27 ($A_2$). It is known that magnetic saturation in the air gap region and pole tips of the switched reluctance motor can significantly enhance the torque output. In this regard, the desire for pole tip saturation to increase output torque dictates a radially length of an air gap 37 as small as possible for reasonable manufacturing ease.

Referring to the drive 33 for the switched reluctance motor shown in FIG. 1, only the basic electrical circuit used to drive the phase A windings $A_1$ and $A_2$ of the switched reluctance motor is illustrated. It will be appreciated that the drive 33 includes similar electrical circuitry for phases B and C. For phase A, when the gates 39 and 41 of the drive 33 are closed, current builds up in the windings $A_1$ and $A_2$ under the excitation of direct voltage from a power source 43. When the gates 39 and 41 are open, the current transfers to the diodes 45 and 47, and the windings $A_1$ and $A_2$ see the reverse voltage which causes the current to collapse. Pulses of current are thereby supplied to each of the phases A, B and C in sequence and, for motoring operation, each pulse causes the most adjacent rotor pole to move towards alignment with the energized stator pole.

As indicated by the arrow 49, the rotor 17 steps around in the opposite direction to the sequence of stator pole excitations as is well known in the art. It should be noted, however, that thinking in terms of "steps" of rotor rotation is only helpful from the viewpoint of understanding the rotation—in practice the current pulses are controlled by the controller 51 in response to the rotor position sensor 35 to occur at specific angles θ of the rotor. The commutation of the current is controlled to occur at specific rotor angles θ in order to give a smooth rotational transition of a rotor pole 31 passed an attracting stator pole 27 in order to ensure continuous rotation without cogging. This generally means that a phase winding is substantially de-energized before the stator and rotor poles 27 and 31 align.

Figure 2:
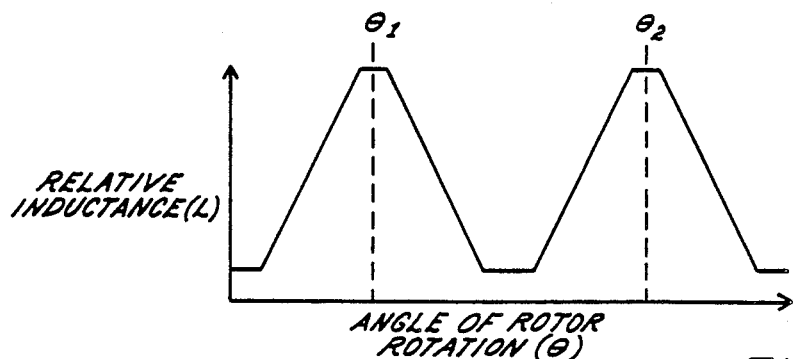
FIG. 2 is an exemplary and idealized graph illustrating a cyclic variation of inductance L experienced by a given phase relative to a mechanical angle $\theta$ of the rotor.

Briefly turning to a more detailed discussion of motor operation, motoring torque in an switched reluctance motor is produced if a phase is energized during the time interval when the inductance of the phase is increasing (i.e., a rotor pole is approaching a stator pole of the phase). A given phase undergoes a cyclic variation of inductance as rotation occurs. Making the simplistic assumption that the inductance L is independent of the current, this variation is shown in FIG. 2 for each stator pole in a phase. A first rotor pole aligns with the stator pole at a rotor angle of $\theta_1$. With continued rotor rotation, the next alignment of a rotor pole occurs at $\theta_2$. As can be seen, the inductance L is the greatest when a rotor pole is aligned with the stator pole. In the four-pole rotor of FIG. 1, the difference $\theta_2 - \theta_1$ equals 45°, since the rotor poles are evenly spaced. The mechanical angle of rotor rotation between low inductance points is hereinafter referred to as the "stroke angle."

Figure 3:
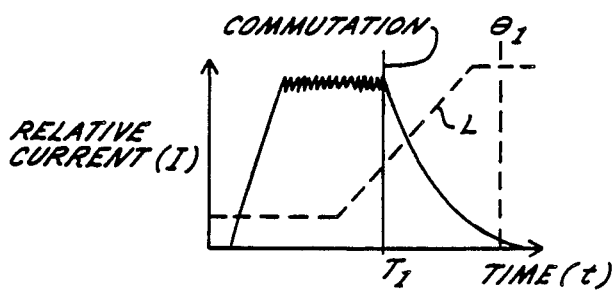
FIG. 3 is an exemplary graph of a current waveform for a given phase relative to the time t of mechanical rotation of the rotor, illustrating how the commutation of a phase must lead the mechanical rotation of the rotor in order to ensure continuous motoring.

For continuous rotation of the switched reluctance motor, the timing of a typical energizing current pulse applied to a winding relative to the time of rotor angle $\theta_1$ is shown in FIG. 3. Energy is controllably supplied during the period up to the commutation time $T_1$, by the opening and closing of gates 39 and 41—i.e., pulse-width modulation. To ensure motoring operation with no more than acceptable ripple torque, the commutation time $T_1$ occurs at a time before the mechanical angle $\theta_1$ is reached; that is, the phase winding is commutated before stator and rotor poles 27 and 31 align. Also, by commutating during a time of rising inductance L, a maximum amount of energy may be converted to motoring and a minimum to generating. In other words, during excitation of a phase by a current I, some of the energy is converted to mechanical output, some is stored in the magnetic field and some is lost in the copper or iron. During the period after commutation, the continued rotation of the rotor 17 partly returns the energy to the supply and partly converts it to further mechanical output and losses.

The primary source of losses in an switched reluctance motor occurs in the stator 19. The losses in the stator 19 primarily consist of hysteresis and eddy current losses. To reduce the eddy current losses, the stator 19 and rotor 17 are constructed of a laminated steel alloy as previously indicated. Eddy current losses, however, remain significant and are related to the frequency of the cyclic building and collapsing of magnetic fields in the stator. In conventional switched reluctance motors such as the motor of FIG. 1, all portions of the back iron experience a cycle of building and collapsing magnetic fields in response to energization of the motor by each phase. The frequency of this cyclic building and collapsing of magnetic fields in the stator is hereinafter called the "flux switching frequency." In the conventional motor of FIG. 1, the flux switching frequency in the back iron of the stator is equal to three times the phase switching frequency or commutation frequency.

As for the hysteresis losses, the frequency of flux reversal effects their magnitudes. Flux reversals are created when the direction of flux flow in overlapping magnetic circuits conflict. Such a conflict can occur using various drive schemes. Typically, the stator poles do not experience flux reversals. However, segments of the back iron or yoke 29 of the stator 19 may experience a flux reversal for each switching of the phases, the rotor poles 31 may experience as many as one flux reversal per revolution.

Because of non-linearities introduced by operation of the switched reluctance motor in saturated conditions, the procedure for calculating losses in a switched reluctance motor is complex. However, an easy and quantitative comparison can be made between conventional switched reluctance motors and motors according to the invention since it is known that the flux switching frequency and the frequency of flux reversals in the back iron of the stator are related to eddy currents and hysteresis losses in the motor, the two primary sources of iron losses in motors.

With opposing stator poles 27 ($A_1$) and 27 ($A_2$) associated with phase A as is shown in FIG. 1, the windings $A_1$ and $A_2$ are oppositely wound about the poles so that one pole face 27a has a north polarity and the other has a south polarity. With this configuration, the flux path is, as indicated by the solid lines 51, through the rotor 17 and around the back iron 29 of the stator 19. Upon energization of stator poles 27 ($B_1$) and 27 ($B_2$) by phase B, the associated windings (not shown) will set up a flux pattern similar to that developed by windings $A_1$ and $A_2$ of phase A as indicated by a dashed lines 53. For the segments 55 and 57 of the back iron or yoke 29, it can be seen that the direction of the flow of the flux reverses from phases A to B. Similar flux reversals occur in other segments of the yoke 29 when phase B is turned off and phase C is turned on. A third pair of segments of the back iron or yoke 29 experiences flux reversal when phase C is turned off and phase is turned on. Collectively, the pairs of back iron segments account for the entire area of the yoke 29. The same type of flux reversal occurs during "two-phase-on" operation of the three-phase switched reluctance motor in FIG. 1.

Because the flux paths for each phase extends around the entire back iron area of the yoke 29, each portion of the back iron area is incorporated into three flux paths—one from each phase. Accordingly, every portion of the back iron experiences a flux switching frequency that is three times the switching or commutation frequency of each phase. More generally, conventional switched reluctance motors such as the motor of FIG. 1 are characterized by a flux switching frequency in the back iron of the stator which is equal to the commutation frequency multiplied by the number of phases energizing the motor.

For a six stator, four rotor pole arrangement as shown in FIG. 1, one complete revolution of the rotor requires four cycles of the phase sequence A, B, C. In terms of motor RPM, each segment of the back iron or yoke 29 experiences a flux change twelve times per one complete rotor revolution and a phase reversal four times. Operating at 7,500 RPM, the flux switching frequency and frequency of flux reversal in the stator of FIG. 1 are 1500 HZ and 500 HZ, respectively. As previously indicated, these frequencies are indicative of core losses in the stator primarily related to eddy current and hysteresis losses, respectively.

A. ELECTRONICALLY COMMUTATED RELUCTANCE (ECR) MOTORS

In contrast to the foregoing conventional variable speed drive, co-pending U.S. application Ser. No. 232,436 discloses a motor construction and energization scheme which minimizes the flux switching frequencies and eliminates flux reversals in the back iron of the stator of an electronically commutated reluctance motor, herein called an ECR motor. In order to eliminate flux reversals in at least the stator of the ECR motor, adjacent stator pole teeth are simultaneously polarized so as to have opposite polarities. In addition to the elimination of flux reversals, energizing adjacent stator poles minimizes the back iron of the stator in the magnetic path. By minimizing the back iron in the magnetic flux path, energy losses caused by the collapsing and building of magnetic fields in the back iron are greatly reduced. Specifically, the ECR motor of U.S. application Ser. No. 232,436 is energized in a manner to prevent or at least reduce (relative to conventional switched reluctance motors) the overlapping of magnetic fields in the back iron of the stator. By reducing the occurrence of overlapping magnetic fields in the back iron, the frequency of collapsing and building magnetic fields is drastically reduced. As a result of this reduction, eddy current and hysteresis losses are substantially less in an ECR motor than in a conventional switched reluctance motor.

Figure 4C:
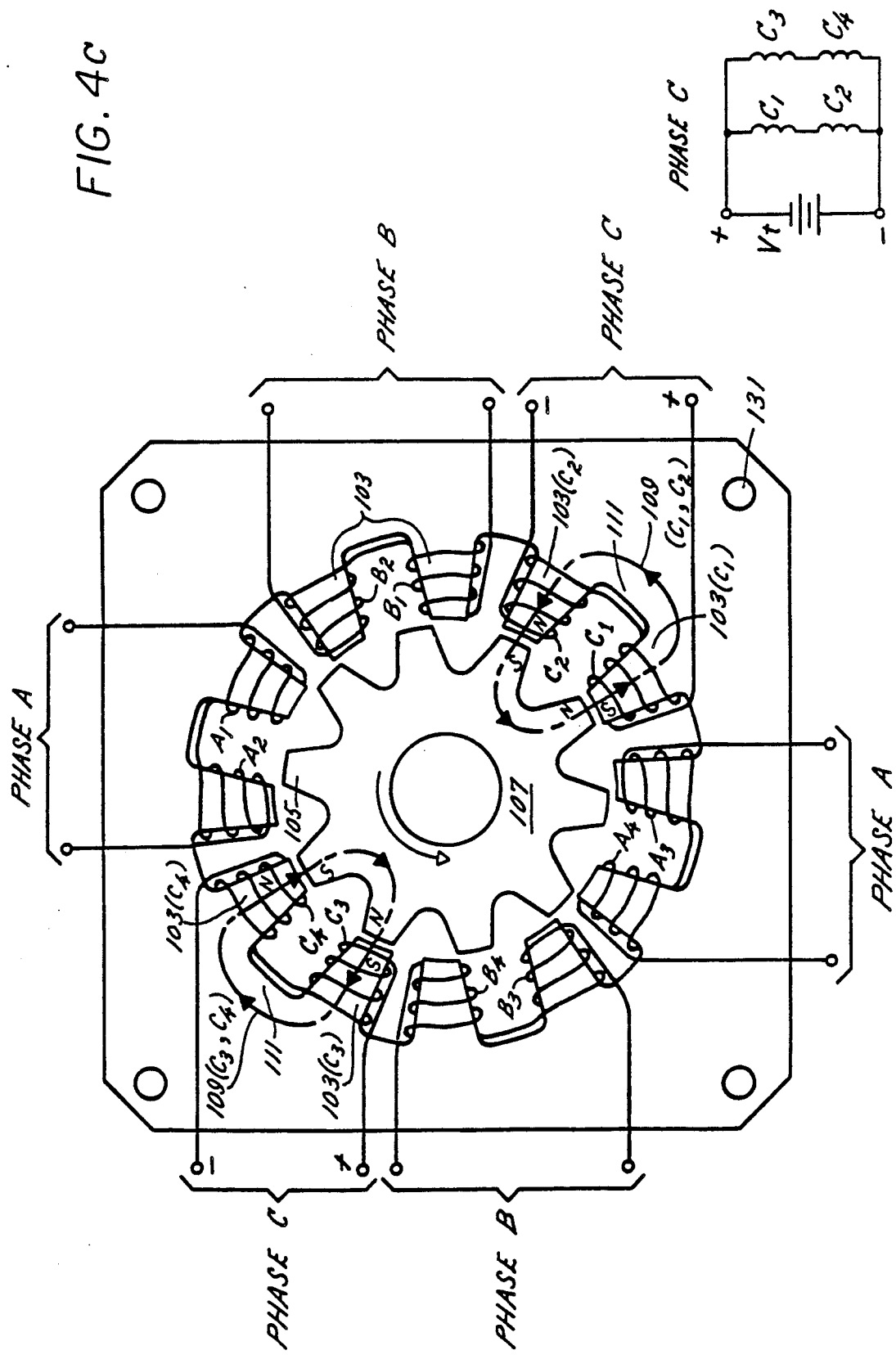
Figure 8A:
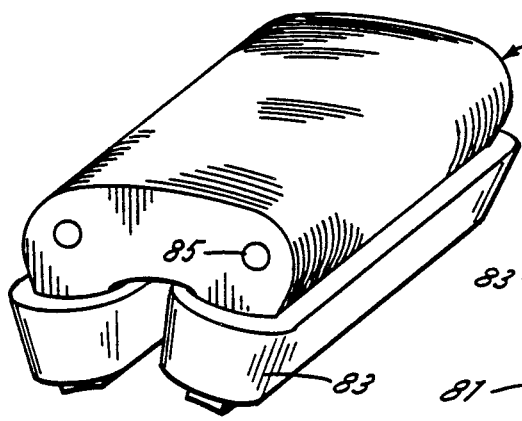
FIGS. 8a–8b are perspective views of a stack of U-shaped laminations forming one pair of stator poles wound with wire to form coils energized by the same phase of a polyphase power source in accordance with the invention.

Referring to FIGS. 4a–4c, a three-phase ECR motor according to the '436 application has two pairs of stator poles energized per phase of a polyphase power source V+. With a three-phase source and two pairs per phase, the stator 101 has a total of 12 stator poles 103. The polarity of each stator pole 103 associated with an energized winding is indicated in FIGS. 4a–4c by a label "N" for a north pole or "S" for a south pole. Each of the FIGS. 4a–4c illustrate the low reluctance alignment of polarized pairs of adjacent stator and rotor poles 103 and 105, respectively, in response to the sequential energization of the ECR motor by phases A (FIG. 8a), B (FIG. 8b), and C (FIG. 8c). The poles of the rotor 107 are evenly spaced whereas the poles of the stator 101 are alternatively spaced by angles $\alpha_1$ and $\alpha_2$. The windings $A_1$–$A_4$, $B_1$–$B_4$, and $C_1$–$C_4$ are wrapped about the stator poles 103 such that adjacent poles separated by the larger angle $\alpha_2$ form adjacent pairs of opposite polarities. With the pairs of the stator poles 103 defined by adjacent poles separated by the angle $\alpha_2$, the rotor poles 105 are also then separated by the angle $\alpha_2$ in order to provide for a low reluctance radial alignment of rotor and stator poles. As can be seen by the circuit diagrams associated with FIGS. 4a–4c, the windings of each phase A, B, and C are preferably connected so that the two windings of each pair are in series and windings of each pair are in parallel with the windings of the other pairs energized by the phase.

Upon energization of the ECR motor of FIGS. 4a–4c by phase A of a power source V+, adjacent pairs of stator poles 103 ($A_1$), 103 ($A_2$), and 103 ($A_3$), 103 ($A_4$) are energized so as to created magnetic circuits 109 ($A_1$, $A_2$) and 109 ($A_3$, $A_4$) whose flux flows between the poles of each pair by way of the back iron area 111 of the stator 101 bridging the adjacent poles in a pair and the adjacent pair of rotor poles 105 which bridges the pole faces of the pair. Because of the uneven spacing of the stator poles 103, upon creation of magnetic circuits 109 ($B_1$, $B_2$) and 109 ($B_3$, $B_4$) by application of phase B to the windings $B_1$, $B_2$, $B_3$ and $B_4$ of the ECR motor (FIG. 4b), adjacent pairs of rotor poles 105 are drawn into low reluctance alignment with the pairs of stator poles 103, thereby imparting torque to the motor (FIG. 4b). In a similar manner, generation of magnetic circuits 109 ($C_1$, $C_2$) and 109 ($C_3$, $C_4$) by polarized stator poles 103 ($C_1$), 103 ($C_2$), 103 ($C_3$), and 103 ($C_4$) draws pairs of adjacent rotor poles 105 into radial alignment so as to provide a low reluctance path between the pole faces of the pairs of stator poles (FIG. 4c).

The polarities of the two pairs per phase of the motor in FIGS. 4a–4c are determined so that the only possible flux path from a polarized stator pole 103 is through the other pole in the stator pair. To accomplish the foregoing in the two-pair per phase motor of FIGS. 4a–4c, the windings of a phase are energized so that a clockwise or counterclockwise path taken through the back iron from a selected one of the stator poles energized by a phase winding does not reach the opposite pole of the second pair without first passing either the opposite pole of the same pair or the same pole of the second pair. For example, in FIG. 4a phase A energizes windings $A_1$, $A_2$, $A_3$ and $A_4$ in a manner such that stator poles 103 ($A_1$) and 103 ($A_3$) are energized as south poles and stator poles 103 ($A_2$) and 103 ($A_4$) are energized as north poles. Referring to stator pole 103 ($A_1$), a path traced through the back iron from the pole in either a clockwise or counterclockwise direction will not provide a possible flux path to the north pole of stator pole 103 ($A_4$). As can be seen from FIG. 4a, the energized poles 105 of the rotor 107 have a north/south positional relationship such that a flux path through the rotor connecting the two pairs is also not possible. In this regard, the pattern of the polarization of pairs of rotor poles 105 maintains the same relationship as does the polarity pattern of the stator poles.

Referring to FIG. 4b, the energization of windings $B_1$, $B_2$, $B_3$ and $B_4$ by phase B polarizes stator poles 103 ($B_1$), ($B_2$), ($B_3$) and ($B_4$) in a manner which provides the same positional polarity with relationship as illustrated in FIG. 4a. As for FIG. 4c, phase C energizes windings $C_1$, $C_2$, $C_3$ and $C_4$ so as to energize stator poles 103 ($C_1$), ($C_2$), ($C_3$) and ($C_4$) in a similar relative positional relationship as the stator pole pairs energized by phases A and B.

In ECR motors having a yoke, secondary magnetic circuits may be created when more than one pair of stator poles are polarized at a given time. Such a situation occurs in two ways, i.e., two phases of a power source energizing windings at the same time or two or more pairs energized by one phase. The former occurs as a result of an energization scheme and the latter from the motor construction. When even numbers of pairs are energized by a single phase, polarities may be assigned to the poles so that no secondary magnetic circuits occur. However, excitation of an odd number of pole pairs by a single phase results in the generation of secondary circuits linking poles of adjacent pairs, regardless of the type of drive utilized. When more than two phases of a polyphase power source energize two or more windings using a unipolar drive, secondary magnetic circuits always occur. Substituting a bipolar drive totally or partially eliminates these secndary magnetic circuits, depending upon the precise nature of the excitation scheme.

The 12-pole ECR motor of FIGS. 4a–4c may be energized by a two-phase-on scheme. Using a unipolar drive, secondary magnetic circuits are generated by a two-phase-on energization scheme once every cycle of the phases A, B, and C. In other words, the back iron of the stator 101 experiences a flux switching frequency of twice the commutation frequency, which is still approximately 33% better than a conventional switched reluctance motor. Moreover, the secondary magnetic circuits do not introduce flux reversals, so the hysteresis losses should be substantially unaffected. Such a unipolar drive, however, is conceptually less desirable than a bipolar drive which completely eliminates the secondary magnetic circuits for a two-phase-on energization scheme of the ECR motor of FIGS. 4a–4c.

Figure 5:
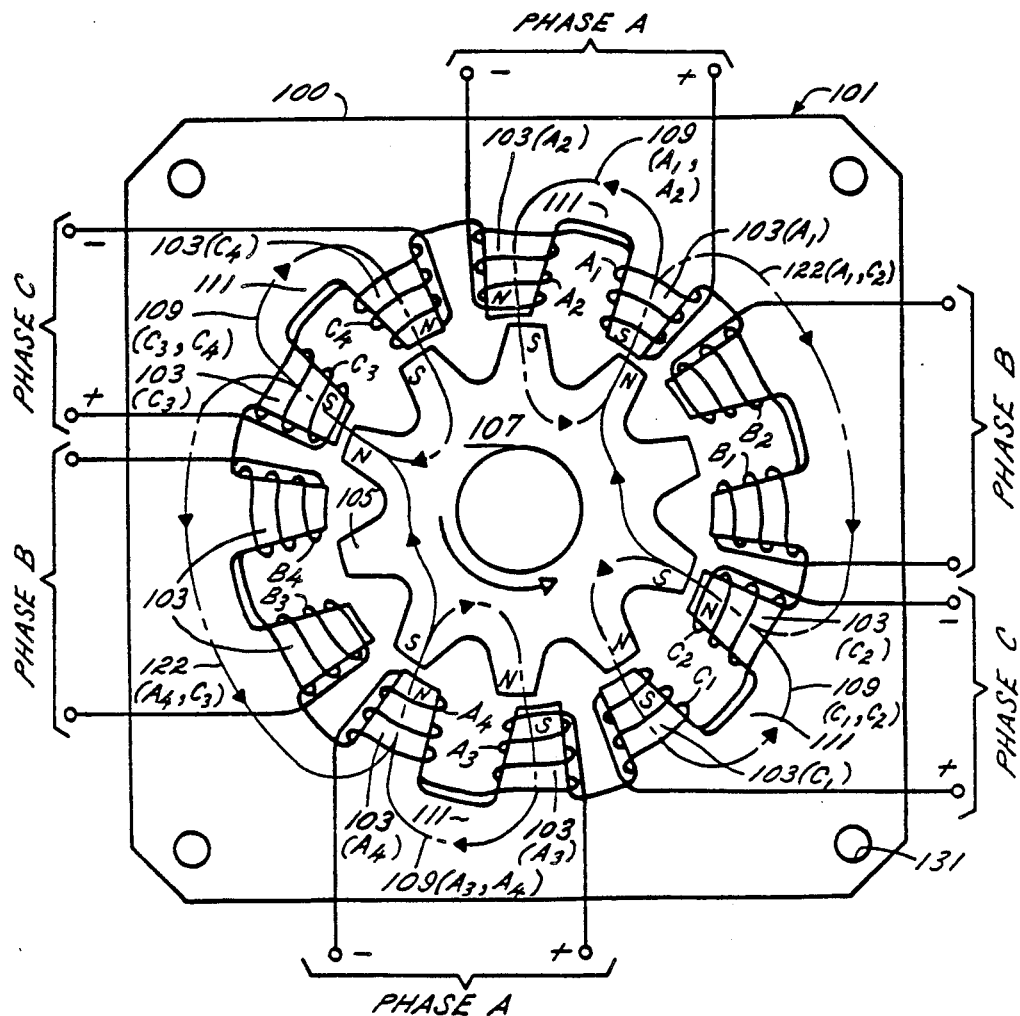
FIG. 5 is a schematic diagram of the three-phase ECR motor of FIGS. 4a–4c, illustrating the "secondary" magnetic circuits generated by a two-phase-on energization scheme utilizing a unipolar drive.

Without utilization a bipolar drive to reverse polarity of the windings at the end of each sequence of phases A, B and C, the magnetic field pattern of FIG. 5 is created. Two-phase-on excitation of the ECR motor of FIGS. 4a–4c by a unipolar drive maintains a static polarity on the stator poles, resulting in one secondary magnetic circuit per sequence of phase excitation to occur. In FIG. 5, secondary magnetic circuits 122 ($A_1$, $C_2$) and 122 ($A_4$, $C_3$) cause flux reversals in the back iron 100 of the stator 101. Using a bipolar drive, however, the secondary circuits 122 ($A_1$, $C_2$) and 122 ($A_4$, $C_3$) are eliminated.

Figure 6A:
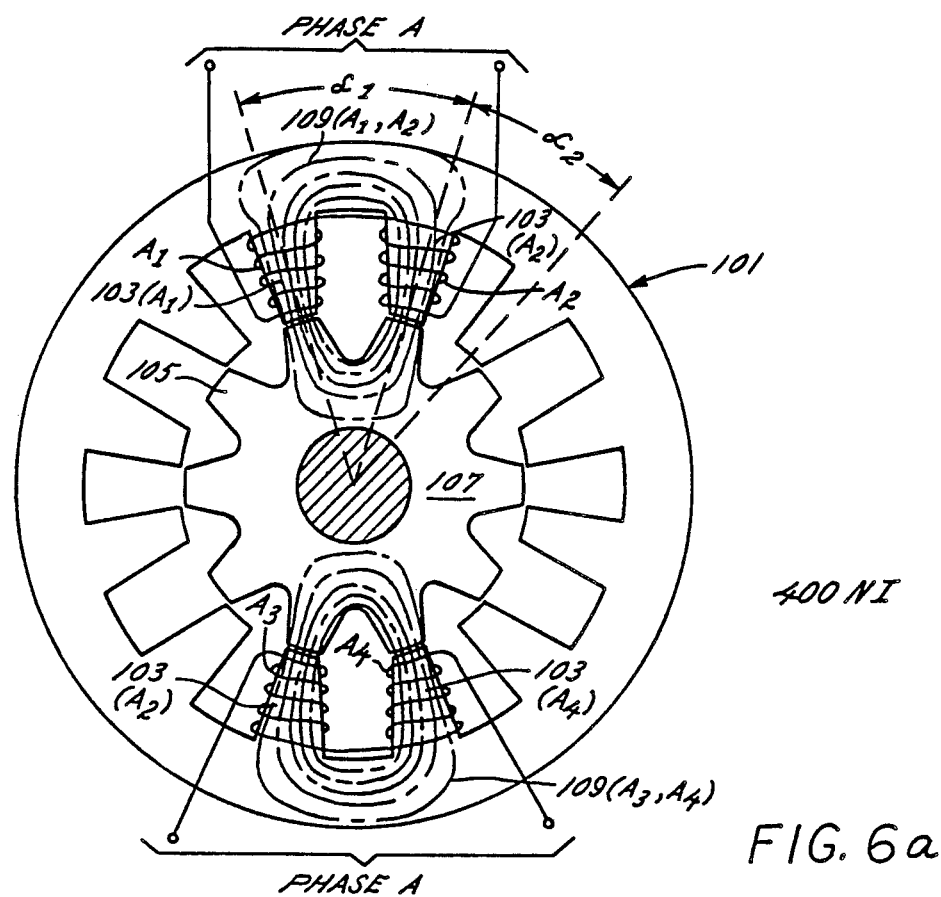
FIGS. 6a–6b are schematic illustrations of the cross-sectional views of FIGS. 4a–4c, showing the lines of magnetic flux for a one-phase-on energization scheme wherein 400 NI are utilized to drive the motor (FIG. 6a) in comparison to 800 NI (FIG. 6b) which causes "secondary" magnetic circuits.
Figure 6B:
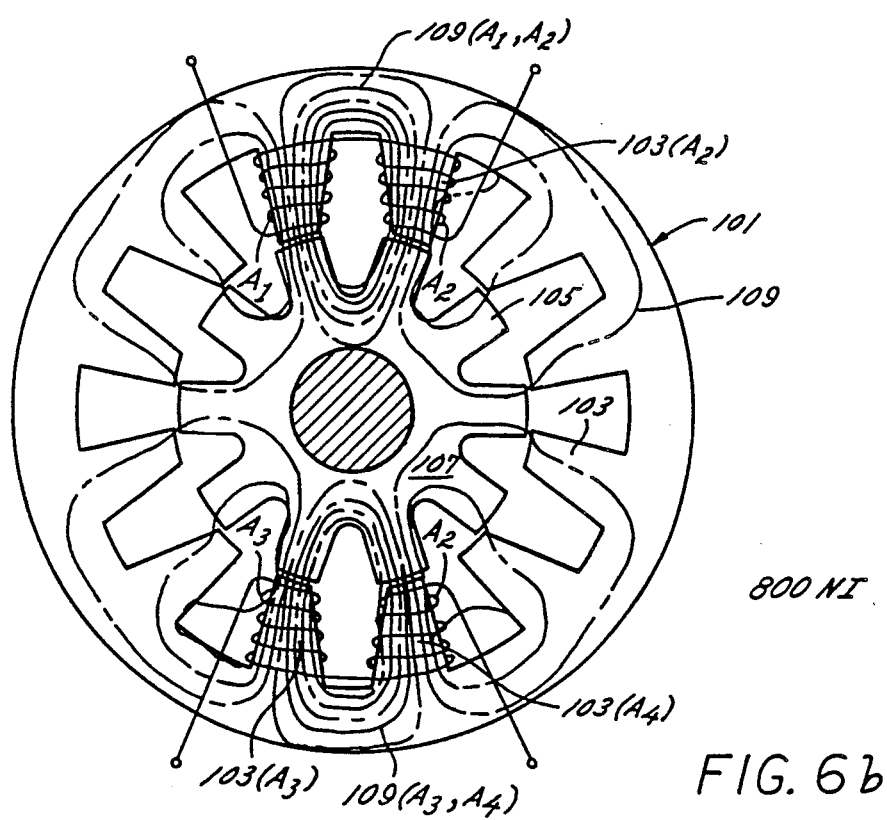

A problem that cannot be resolved by the incorporation of a bipolar drive is illustrated in FIGS. 6a and 6b. The ECR motor of FIGS. 4 and 5 is illustrated in FIG. 6a with flux density lines for a 400 NI energization of phase A of the stator 101, where N is the number of wire turns per pole and I is the wire current in amperes. As FIG. 6a indicates, the magnetic flux of the two stator pole pairs 103 ($A_1$), 103 ($A_2$) and 103 ($A_3$), 103 ($A_4$) of phase A form magnetic circuits 109 ($A_1$, $A_2$) and 109 ($A_3$, $A_4$) which are isolated from one another. If the motor is driven harder than 400 NI, the flux concentration at the faces of the stator and rotor poles 103 and 105, respectively, becomes increasingly saturated such that the reluctance at the interface between the aligned stator and rotor poles approaches the reluctance of alternative flux paths. In this regard, FIG. 6b shows the ECR motor of FIG. 4a with an 800 NI energization for phase A. With the motor energized at this level, the reluctance at the interface between the aligned rotor and stator poles 105 and 103 has become sufficiently great such that the flux 109 now seeks alternative paths through stator poles 103 not fully aligned with poles 105 of the rotor 107. Accordingly, undesirable secondary magnetic circuits 109 are generated.

Applicants note that the magnetic flux patterns of FIGS. 6a and 6b were created with the aid of a computer program used to simulate operation of the ECR and conventional variable reluctance motors. The program is entitled MAGNETO ™, a boundary element magnetic field solver published by Integrated Engineering Software, Inc. of Winnipeg, Canada. The motor of FIGS. 6a and 6b has a 165 millimeter outer diameter for the stator. The stator and rotor were considered to be laminations made of non-oriented silicon steel (i.e., M19).

Figure 7:
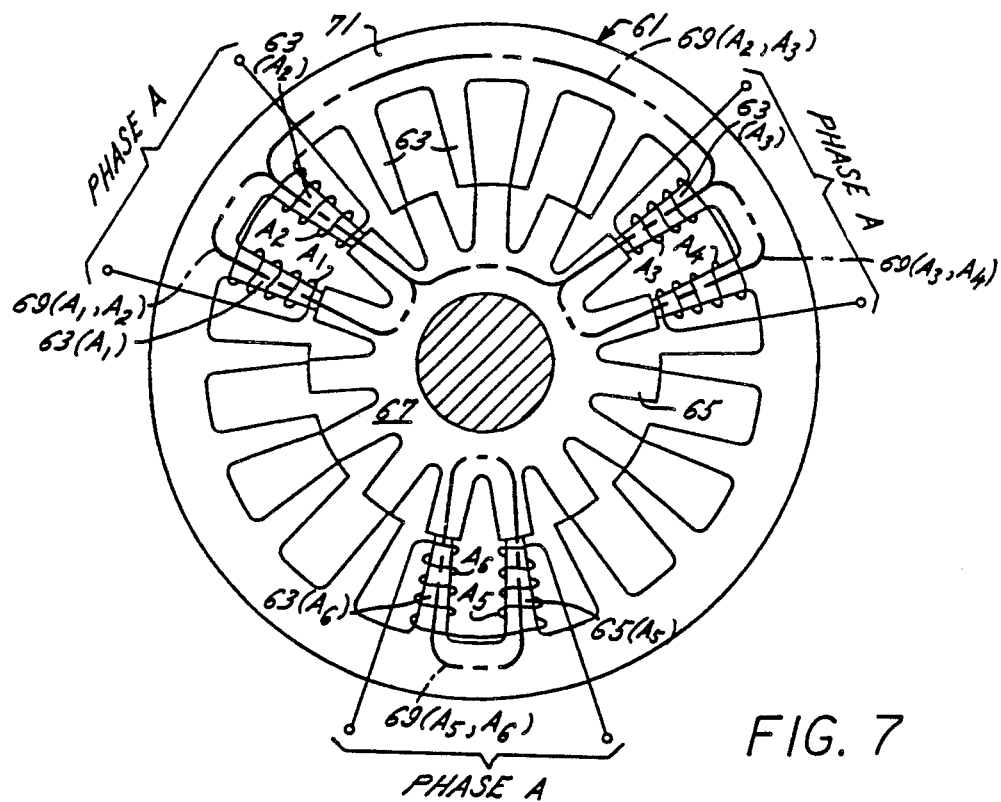
FIG. 7 is a schematic cross-sectional view of a three-phase ECR motor without the improvement of the invention wherein three pairs of stator poles are energized per phase and the motor is energized in accordance with a one-phase-on scheme, illustrating that "secondary" magnetic circuits may be generated for one-phase-on energization schemes for particular ECR designs.

As previously mentioned, excitation of an odd number of stator pole pairs of an ECR motor by a single phase results in the generation of secondary circuits linking poles of adjacent pairs, regardless of the type of drive or excitation scheme utilized. An example of an ECR motor having an odd number of pole pairs per phase is illustrated in FIG. 7. A stator 61 includes 18 stator poles 63 and 15 poles 65 of a rotor 67 mounted for rotation on a shaft 68. Windings $A_1$–$A_6$ are series connected to phase A of a three-phase power source (not shown).

In keeping with the construction of an ECR motor, adjacent stator poles 63 are energized by the windings $A_1$–$A_6$ so as to form three pairs of stator poles wherein each pair includes adjacent poles of opposite polarity. With an odd number of stator pole pairs, it will readily be appreciated that it is impossible to assign polarities to the poles of the pairs in a manner which results in both maintaining opposite polarities for the poles of a pair and the same polarity for adjacent poles of different pairs.

Stator poles 63 ($A_1$) and 63 ($A_2$) are energized by windings $A_1$ and $A_2$, respectively, so as to form a pair of north and south poles. A primary magnetic circuit 69 ($A_1$, $A_2$) links the two poles of the pair. Similarly, stator poles 63 ($A_3$) and 63 ($A_4$) are energized by windings $A_3$ and $A_4$, respectively, to form poles of opposite polarity, generating primary magnetic circuit 69 ($A_3$, $A_4$). The third pole pair, stator poles 63 ($A_5$) and 63 ($A_6$) are energized by windings $A_5$ and $A_6$, respectively, to form poles of opposite polarity which generate the primary magnetic circuit 69 ($A_5$, $A_6$). Because adjacent stator poles 63 ($A_2$) and 63 ($A_3$) of different pole pairs are of opposite polarity, a secondary magnetic circuit 69 ($A_2$, $A_3$) is generated through a yoke 71, defining a back iron area of the stator 61. Without destroying the primary magnetic circuits 69 formed by the three stator pole pairs, it is impossible to eliminate all secondary magnetic circuits. The particular secondary magnetic circuit 69 ($A_2$, $A_3$) illustrated in FIG. 7 may be eliminated by reversing the polarity of one of the two stator pole pairs which are linked by the secondary circuit. By reversing one pair, there no longer is adjacent poles of different pairs with opposite polarity. However, by eliminating the secondary magnetic circuit 69 ($A_2$, $A_3$) in FIG. 7, a substantially similar magnetic circuit will link the pole pair of stator poles 63 ($A_5$) and 63 ($A_6$) with whichever pole pair has had its polarity reversed. There is simply no way to provide the generation of secondary circuits through the back iron when an odd number of stator pole pairs are simultaneously energized.

B. ECR MOTORS ACCORDING TO THE INVENTION

Figure 8B:
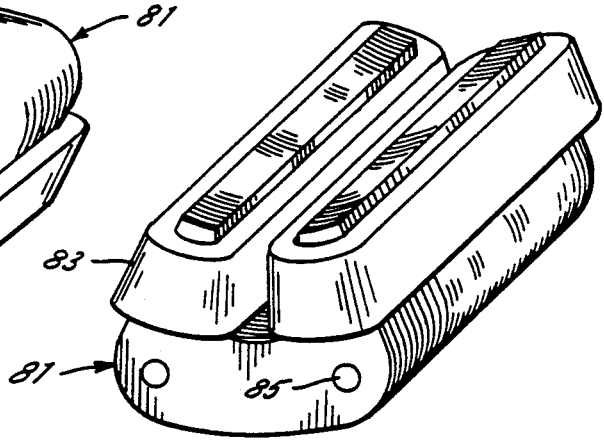
Figure 9A:
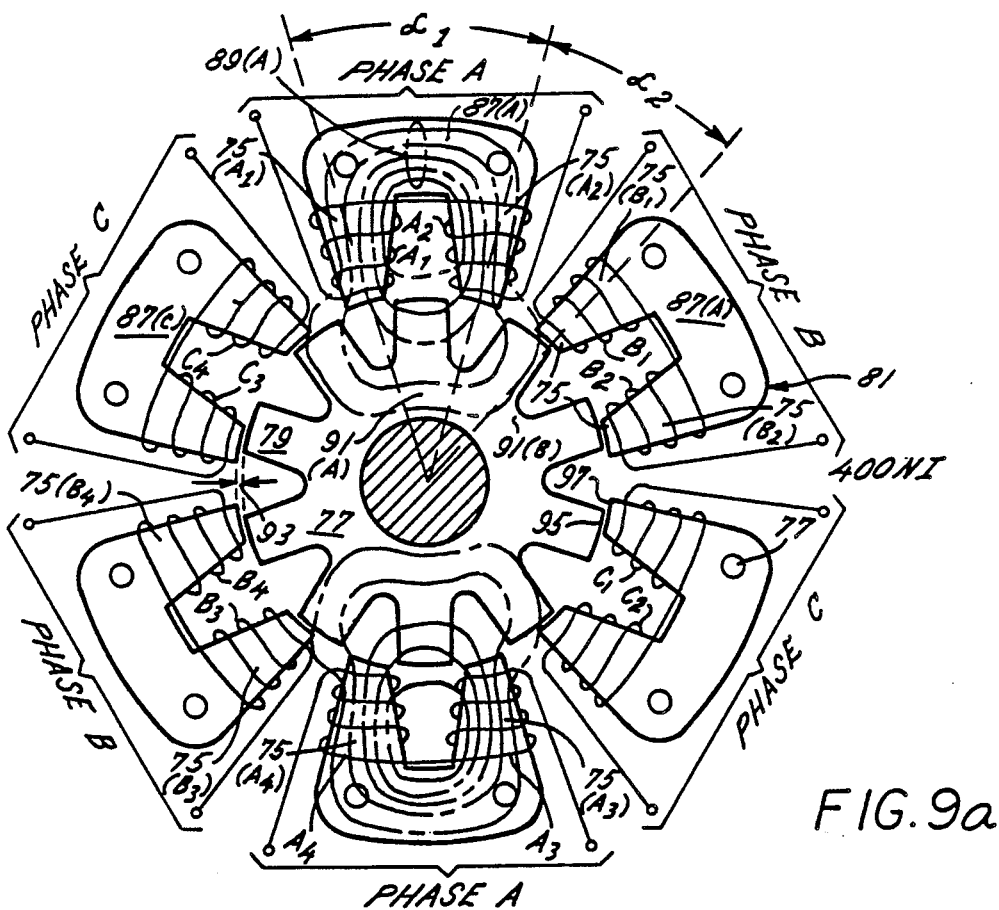
FIGS. 9a–9b are schematic cross-sectional views of a three-phase ECR motor of the type illustrated in FIGS. 4–6, modified to incorporate the invention.
Figure 9B:
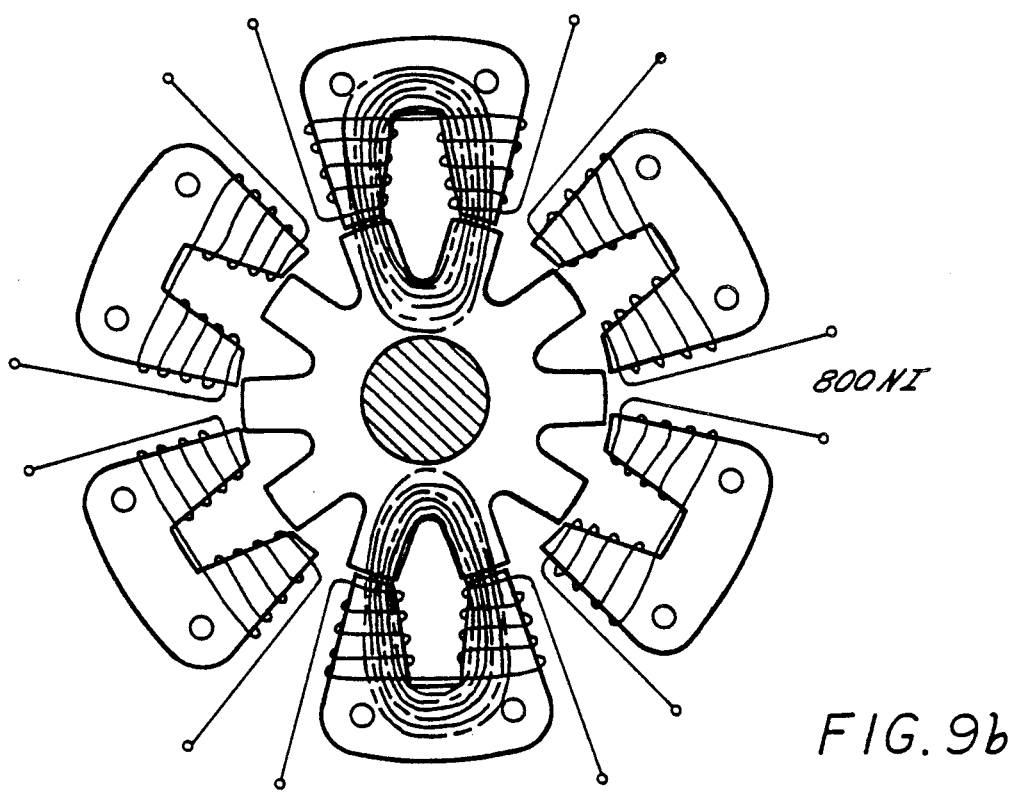
Figure 10:
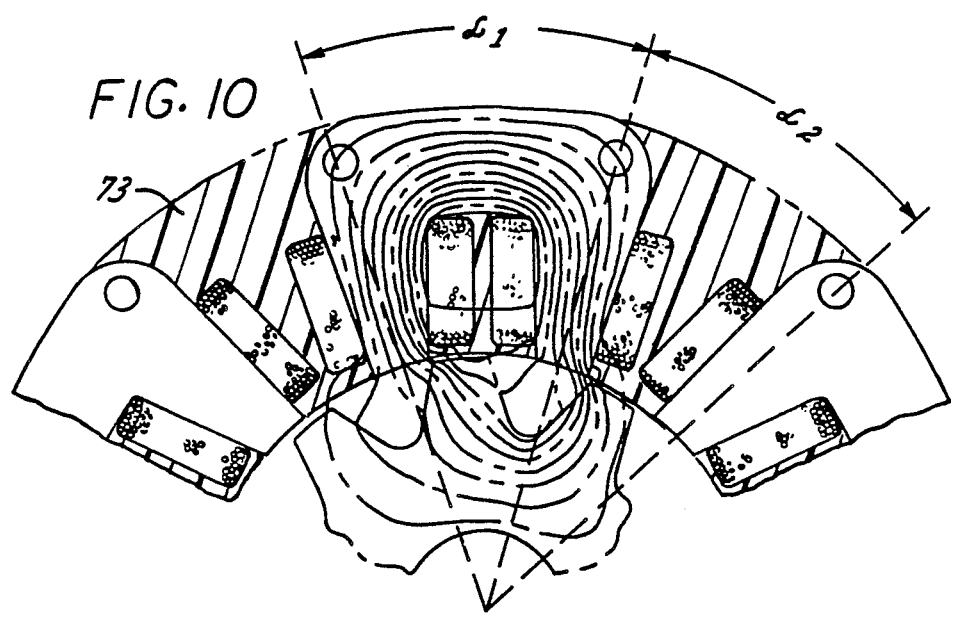
FIG. 10 is an enlarged partial view of a three-phase ECR illustrated in FIGS. 9a-9b with non-magnetic material filling the gaps between pairs of stator poles.

In accordance with one important aspect of the invention, each pair of stator poles in an ECR motor is magnetically isolated from all other stator pole pairs, thereby preventing secondary magnetic circuits from occurring, regardless of the number of pairs energized per phase or the energization scheme employed. Therefore, the highest efficiency and full performance potential of an ECR motor are realized without the need to consider relative polarities of stator poles in different pairs or to provide a bipolar drive. To provide for the magnetic isolation of each stator pole pair, the stator is constructed of a plurality of stacks of U-shaped laminations as illustrated in FIGS. 8a–8b. To form a stator, a plurality of these stacks are circumferentially arranged as, for example, illustrated in FIGS. 9a and 9b. With the stator constructed of stacks of U-shaped laminations, there is no continuous back iron or yoke which provides a low-reluctance path joining all of the poles of the stator as in the conventional stator of an ECR motor. Instead, a high-reluctance medium separates each of the pole pairs and prevents significant magnetic coupling between as shown in FIGS. 9a–9b. In its simplest embodiment, the high-reluctance medium may merely be the air filling the circumferential gap between adjacent pairs of stator poles. If the working environment is sufficiently clean, such an open stator arrangement can provide cooling to the rotor which is otherwise impossible to achieve without the use of external fans. Some environmental protection can be added while maintaining this self-cooling feature by adding a filter assembly (not shown) over the outer perimeter of the stator. In working environments, where an open or filtered gap in the stator is not acceptable, material that is not gas permeable can be placed into the gap, for example an epoxy resin 73 as shown in FIG. 10.

For the purpose of illustrating the principle of the invention, FIGS. 9a–9b are exemplary illustrations of an ECR motor according to the invention having two pairs of adjacent stator poles excited by each phase of a polyphase source and having the same dimensions as the conventional ECR motor of FIGS. 4–6; however, an ECR motor according to the invention may have any number of pole pairs per phase, depending on the desired performance characteristics. In this regard, a one-pair-per-phase excitation is believed to be ideally suited for very high speed applications because at high motor speeds the large torque ripple inherent to such motors becomes insignificant. Conversely, the low torque ripple of motors having multiple pole pairs per phase makes such motors better suited for lower speed applications.

Referring to the two-pair-per-phase design of FIGS. 9a–9b, six assembled stacks of stator pole pairs are circumferentially arranged to form a stator 61 held in place by conventional end bells (not shown). Except for the construction of the stator pole pairs, the ECR motor of FIGS. 9a–9b is structually the same as that of FIGS. 4–6. For example, like the ECR motor of FIG. 4–6, the two stator poles 75 in each pair are separated by an intra-pair angle of $\alpha_1$ as measured from the axis of rotation of the rotor 77. The adjacent stator poles 75 of neighboring pairs are separated by an inter-pair angle of $\alpha_2$. In order to provide for radial alignment of the rotor poles 79 with the stator poles 75 of each pair, the rotor poles 79 are spaced apart by the angle $\alpha_1$.

Unlike the ECR motor of FIGS. 4–6, the stator is formed from a plurality of U-shaped laminations stacked to a predetermined length as illustrated in FIGS. 8a–8b. Each stack 81 includes two windings 83 which are energized by a single phase of a polyphase source in keeping with the invention. In the motor of FIGS. 9a–9b, two stacks per phase are provided. The two stacks 81 energized by the same phase are located diametrically opposite are another relative to the cylinder formed by the in-place stacks 81. They are held in place by end bells (not shown) which receive bolts passing through bores 85 in the stacks 81.

It will be appreciated by those familiar with manufacturing techniques for motors and in particular for the windings of a stator that the independent U-shaped stacks 81 may offer manufacturing advantages in some circumstances. For example, if hand wrapping of the windings 83 is necessary, it can be done more quickly and easily for the exposed poles of a U-shaped stack 81 of the invention than for the conventional stator poles which extend radially inwardly from the inside of a stator yolk.

For purposes of comparison with the ECR motor of FIGS. 6a–6b, the exemplary flux patterns and densities for the ECR motor of FIGS. 9a–9b illustrate energization levels of 400 and 800 NI, respectively. The flux patterns and densities of FIGS. 9a–9b were created with the aid of the same computer program used to generate the patterns and densities of FIGS. 6a–6b. In this regard, the motors of FIGS. 6 and 9 are considered to have the same important operating parameters—i.e., stack length, diameter and material composition.

From a visual comparison of FIGS. 6b and 9b, it will be seen that an ECR motor of the invention inhibits generation of secondary magnetic circuits when the ECR motor is driven at a relatively high energy level, causing a high degree of flux saturation within the energized poles. The high reluctance areas separating stator pole pairs in the motor of FIGS. 9a–9b maintain flux flow through the energized poles for higher flux densities than does the ECR motor of FIGS. 6a–6b. For this reason, the ECR motor constructed according to the invention not only enables full benefit of the ECR construction to be realized without use of a bipolar drive, it also enables the ECR motor to be powered at higher energy levels without sacrificing the full performance benefits derived from the ECR construction.

Turning to a more detailed discussion of the operation of the ECR motor of FIGS. 9a–9b, excitation of phase A creates a torque which draws the nearest poles 79 of the rotor 77 into alignment with the stator poles 75 ($A_1$) and 75 ($A_2$) associated with series connected windings $A_1$ and $A_2$ and pole 75 ($A_3$) and 75 ($A_4$) associated with series connected windings $A_3$ and $A_4$. In order to ensure continuous rotation (in contrast to step rotation), commutation of phase A leads the mechanical alignment of the rotor and stator poles as discussed in connection with FIGS. 1–3. In this regard, illustrations of the radial alignment of adjacent pairs of stator and rotor teeth are intended only to aid in the understanding of the magnetic fields and not to imply a step-like rotation of the rotor 77.

Magnetic energy flows between the stator poles 75 ($A_1$) and 75 ($A_2$) in the U-shaped stack of laminations associated with phase A via an area 87 (A) of the stack joining the two pole teeth. To complete the magnetic circuit 89 (A) for the flow of magnetic energy or flux through the stator pole pair 75 ($A_1$) and 75 ($A_2$), the pole faces of the rotor pole teeth 79 provide a bridge 91 (A) that magnetically joins the pole faces of the stator pole pair. Also part of the complete magnetic circuit 89 (A) are the areas of the radial air gap 93 interfacing the pole faces of the rotor pole teeth 79 and the pole faces of the stator pole pair 75 ($A_1$) and 75 ($A_2$).

Digressing briefly, it will be appreciated that the particular dimensions of the pole faces 95 and 97 of the stator and rotor poles 75 and 79, respectively, define the nature of the radial air gap 93. For example, the pole faces may have arcuate shapes referenced to the axis of rotor rotation. Such shapes define a uniform air gap 93 illustrated in FIG. 9a. Non-uniform air gaps result from all other shapes of the pole faces. The particular shape chosen for the pole faces is a design consideration unrelated to the invention.

The stator and rotor poles 75 and 79 are preferably tapered as illustrated in order to provide structural resistance to deflection by the magnetic coupling between rotor and stator poles which may cause vibration and to aid in the creation of flux saturation at the pole faces. The taper is a radial taper and extends from the base of each pole to its face. Of course, the areas of the faces of the stator poles 75 are related to the areas of the faces of the rotor poles 79 in order to achieve desired operating characteristics as is conventional in the art.

As can be seen in FIGS. 9a-9b, the taper is not of equal slope on both sides of a stator pole 75. The slopes are adjusted in order to ensure sufficient space is provided for the windings between the stator poles 75 separated by the smaller angle $\alpha_1$. In other words, instead of a symmetrical taper of the sides of each stator pole, the side including the angle $\alpha_1$ has a smaller taper than the side including the angle $\alpha_2$. Although such unsymmetrical tapering is helpful for the purpose of easy fitting of the windings, it is not an essential part of the invention.

In a "one-phase-on" operation of the ECR motor of FIGS. 9a-9b, after phase A is commutated, phase B energizes windings $B_1$, $B_2$, $B_3$ and $B_4$ of a second pair of U-shaped stacks 75 placed diametrically opposite one another and separated by unenergized pairs. The poles of the rotor closest to the two pairs of adjacent stator poles 75 ($B_1$), 75 ($B_2$), 75 ($B_3$) and 75 ($B_4$) of phase B are pulled toward an aligned position with the energized poles. A magnetic circuit for the flux is formed which is similar to the illustrated magnetic circuit 89 (A) of phase A in that the flux primarily travels through the back iron section 87 (B) of the stack forming the four stator poles 75 ($B_1$), 75 ($B_2$), 75 ($B_3$) and 75 ($B_4$). For the flux exiting and entering the pole faces of stator poles 75 ($B_1$), 75 ($B_2$), 75 ($B_3$) and 75 ($B_4$), the rotor poles 77 provide a low reluctance path or bridge 91 (B).

To complete the sequence of three-phase excitation, phase B is commutated and phase C is turned on. With phase C on, windings $C_1$, $C_2$, $C_3$ and $C_4$ of a third pair of U-shaped stacks 81 polarize the associated stator poles 75 ($C_1$), 75 ($C_2$), 75 ($C_3$) and 75 ($C_4$). As with the stator poles of phases A and B, two independent and decoupled magnetic circuits are created through the polarized stator poles. To couple the magnetic poles of each pole pair energized by phase C, the magnetic circuit travels through an area 87 (C) of the stacks 81 forming the four stator poles 75 ($C_1$), 75 ($C_2$), 75 ($C_3$) and 75 ($C_4$) and through a low reluctance path or bridge 91 (B) in the rotor poles 79.

From the foregoing, it can be seen that the motor construction of FIGS. 9a-9b prevents flux reversals, and the back iron areas of the U-shaped stacks experience cyclic building and collapsing of magnetic fields at a frequency equal to the commutation frequency. Both the ECR motor of FIGS. 9a-9b and the conventional switched reluctance motor of FIG. 1 are three-phase motors having six stator poles. However, in contrast to the ECR motor, the conventional switched reluctance motor experiences a flux switching frequency equal to the commutation frequency multiplied by the number of phases and a flux reversal frequency equal to the commutation frequency. Accordingly, an ECR motor constructed in accordance with the invention has significantly less iron losses (eddy current and hysteresis) than the conventional switched reluctance motor of the same type.

In contrast to the illustrated construction of a three-phase, twelve-pole ECR motor according to the invention, an alternative three-phase, twelve-pole ECR motor may be constructed wherein the larger angle $\alpha_2$ defines the intra-pair angle and, therefore, the smaller angle $\alpha_1$, becomes the inter-pair angle. Regardless of whether the ECR motor is constructed with the intra-pair angle as the smaller angle $\alpha_1$ (FIGS. 9a-9b) or as the larger angle $\alpha_2$, the intra-pair angle equals $360/N_R$. Referring again to FIGS. 9a-9b, when the stator poles of a pair are separated by the smaller angle $\alpha_1$, the intra-pair angle $\alpha_1$ equals the angle separating adjacent rotor poles. Such a relationship allows a minimum reluctance to occur for each phase when the stator pole pair of the phase became radially aligned with the poles of the rotor as illustrated. Expressed generally, where the angle $\alpha_1$ equals the intra-pair angle as illustrated, $$\alpha_1 = \frac{360°}{N_R} \tag{1}$$

where $N_R$ is the number of evenly spaced poles on the rotor.

As for the inter-pair angle $\alpha_2$ in FIGS. 9a-9b, it can be appreciated from the illustration that the angles $\alpha_1$ and $\alpha_2$ define an angle of an arc occupied by one pair of stator pole teeth. In this regard, the stator pole pairs are evenly distributed about the stator and separated by equal angles of $\alpha_1 + \alpha_2$. Knowing the distribution of the stator pole pairs and the total number of stator pole teeth $N_S$, a relationship between the total number of stator pole teeth and the circumferential distribution of pole pairs may be expressed generally as $$\frac{2}{N_s} = \frac{\alpha_1 + \alpha_2}{360°} \tag{2}$$

where $2/N_s$ is the ratio of the number of pole teeth in one pair to the number of total pole teeth and $(\alpha_1 + \alpha_2)/360$ is the ratio of the arcuate angle occupied by one pair to the total circle of the stator.

Substituting equation (1) into equation (2) and solving for $N_R$ gives the following:

$$N_R = \frac{360°}{720°/N_S - \alpha_2} \tag{3}$$

Using equation (3), the minimum number of rotor poles can be determined for a given number of stator poles in an ECR motor. For example, in a three-phase motor such as shown in FIGS. 9a-9b, the minimum number of stator poles is six (two for each phase). Equation (3) may be rewritten as follows when $N_S$ equals six.

$$N_R = \frac{360°}{120° - \alpha_2} \tag{4}$$

For the minimum number of rotor poles, setting $\alpha_2$ equal to zero, $N_R$ equals three; however, $\alpha_2$ cannot equal zero for the invention. Therefore, the minimum number of rotor poles $N_R$ must be four. Substituting the value four for $N_R$, equation (4) may be solved for the minimum value of $\alpha_2$.

$$\alpha_2 = 40° \ (min.) \tag{5}$$

For the motor construction illustrated in FIGS. 9a-9b, there are ten rotor poles and six stator poles. Using equations (2), (3) and (4), $$\alpha_1 = 36° \tag{6}$$

$$\alpha_2 = 84° \tag{7}$$

More generally, equation (3) may be used to compile a table such as TABLE I below for all combinations of rotor and stator pole numbers for three, four, five, etc. phase systems. The various combinations of the number of phases and stator and rotor teeth listed in TABLE I are only illustrative and are not intended to be limiting.

TABLE I

| PHASE | $N_S$ | $N_R/\alpha_2$ | $\alpha_1$ | $\alpha_2$ |
|---|---|---|---|---|
| 3 | 12 | 10/36° | 24° | 36° |
| 3 | 18 | 15/24° | 26° | 24° |
| 3 | 24 | 20/18° | 12° | 18° |
| 3 | 30 | 25/144° | 9.6° | 14.4° |
| 3 | 36 | 30/12° | 8° | 12° |
| 3 | 42 | 35/10.28° | 6.85° | 10.28° |
| 3 | 48 | 40/9° | 6° | 9° |
| 4 | 8 | 7/51.43° | 38.57° | 51.43° |
| 4 | 16 | 14/25.71° | 19.29° | 25.71° |
| 4 | 24 | 21/17.14° | 12.86° | 17.14° |
| 4 | 32 | 28/12.86° | 9.64° | 12.86° |
| 4 | 40 | 35/10.29° | 7.71° | 10.28° |
| 4 | 48 | 42/8.57° | 6.43° | 8.57° |
| 5 | 10 | 9/40° | 32° | 40° |
| 5 | 20 | 18/20° | 16° | 20° |
| 5 | 30 | 27/13.33° | 10.67° | 13.33 |
| 5 | 40 | 36/10° | 8° | 10° |
| 5 | 50 | 45/8° | 6.4° | 8° |
| 6 | 12 | 11/32.73° | 27.27° | 32.73° |
| 6 | 24 | 22/13.64° | 13.64° | 16.36° |
| 6 | 36 | 33/10.91° | 9.09° | 10.91° |
| 6 | 48 | 44/8.18° | 6.82° | 8.18° |

For motor constructions according to the invention having only one pair of stator pole teeth per phase simultaneous energization of two pole pairs may occur if more than one phase is applied to the windings at any one time.

Figure 11:
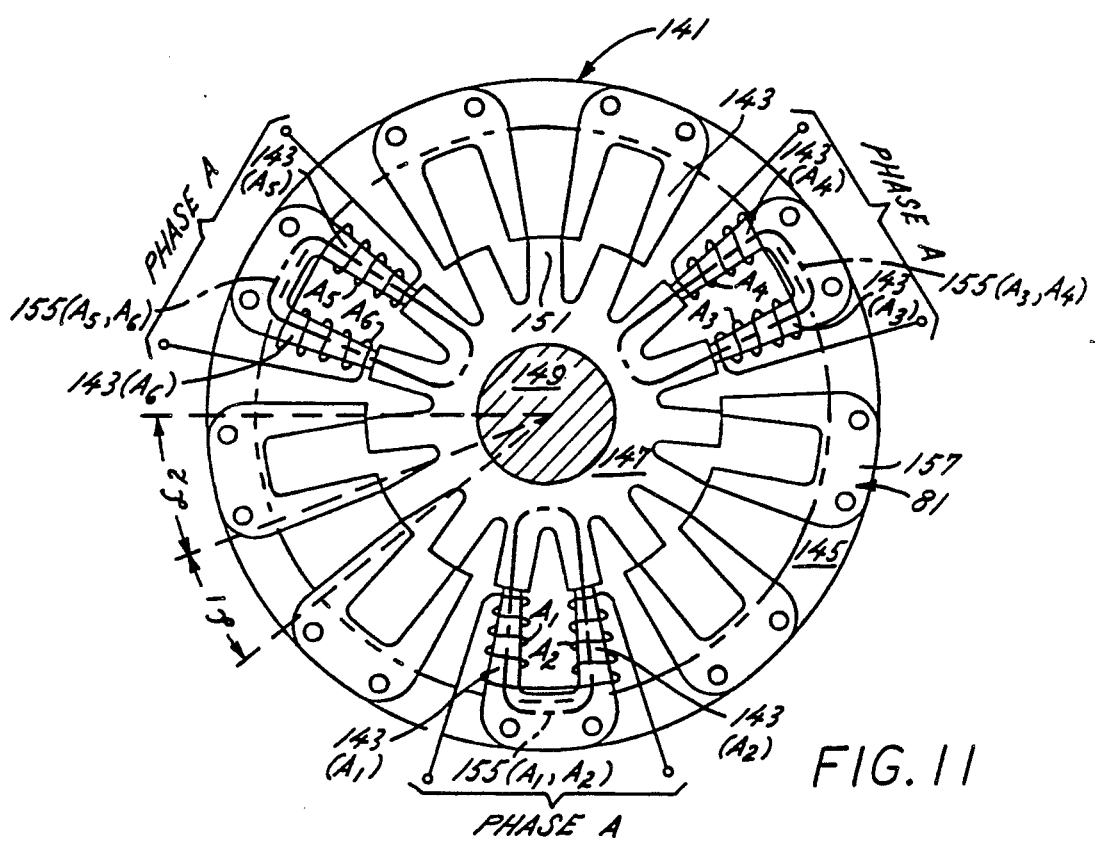
FIG. 11 is a schematic cross-sectional view of three-phase ECR motor of the type illustrated in FIG. 7 modified to incorporate the invention.

In some applications where torque ripple or noise level is an important consideration, motors having more than two stator pole pairs may be preferred over the two-pairs-per-phase construction shown in FIGS. 9a–9b. A conventional three-phase ECR motor having three pairs per phase is illustrated in FIG. 7. FIG. 11 illustrates the ECR motor of FIG. 7 modified to incorporate the invention. With three phases and three pairs per phase, the stator 141 has a total of 18 stator poles 143. As in the embodiment of FIGS. 9a–9b, each pair of stator poles 143 is magnetically isolated and the polarity of each pole in a pair relative to the polarity of poles in other pairs is irrelevant. A cylindrical yoke 145 composed of non-magnetic material (e.g., aluminum or epoxy) closes the stator 141 and seals the rotor 147 and shaft 149 from the ambient environment of the motor. As with the ECR motor of FIGS. 9a–9b, end bells (not shown) hold the pairs of stator poles 143 in place. Some structural support in a circumferential direction is provided by the yoke 145.

FIG. 11 illustrates the low reluctance alignment of polarized pairs of adjacent stator and rotor poles 143 and 151, respectively, in response to the sequencial energization of the ECR motor by phase A of a polyphase source. As with the previous illustrated embodiment of the invention, the poles 151 of the rotor 147 are evenly spaced and the U-shaped stacks 81 (FIGS. 8a–8b) of stator laminations are arranged so that the poles 143 of the stator 141 are alternately spaced by angles $\alpha_1$ and $\alpha_2$. The windings, only $A_1$–$A_6$ are illustrated, are wrapped about the U-shaped stacks 81 to form adjacent pairs of opposite polarities in keeping with the invention. With the pairs of stator poles 143 defined by each U-shaped stack 81 separated by the angle $\alpha_2$, the rotor poles 151 are also then separated by the angle $\alpha_2$ in order to provide for a low reluctance radial alignment of rotor and stator poles 151 and 143, respectively. The windings of each phase A, B and C are preferably connected so that the two windings of each pair are in series and windings of each pair are in parallel with the windings of the other pairs energized by the phase.

Upon energization of the ECR motor of FIG. 11 by phase A of a power source V+, pairs of adjacent stator poles 143 ($A_1$), ($A_2$), ($A_3$), ($A_4$), ($A_5$), ($A_6$) are energized so as to create magnetic circuits 155 ($A_1$, $A_2$), 155 ($A_3$, $A_4$) and 155 ($A_5$, $A_6$), each having flux flows between the poles of the pair by way of the back iron area 157 of the U-shaped stacks 153 and the adjacent pair of rotor poles 151 which bridge the pole faces of the pair. Because of the uneven spacing of the stator poles 143, upon creation of magnetic circuits by application of phase B to the windings $B_1$, $B_2$, $B_3$, $B_4$, $B_5$ and $B_6$ (not shown) of the ECR motor, adjacent pairs of rotor poles 151 are drawn into low reluctance alignments with the pairs of stator poles 143, thereby imparting torque to the motor. In a similar manner, generation of magnetic circuits by polarizing the three pairs of stator poles 143 associated with phase C draws pairs of adjacent rotor poles 151 into radial alignment so as to provide a low reluctance path between the pole faces of the pairs of stator poles.

Figure 12:
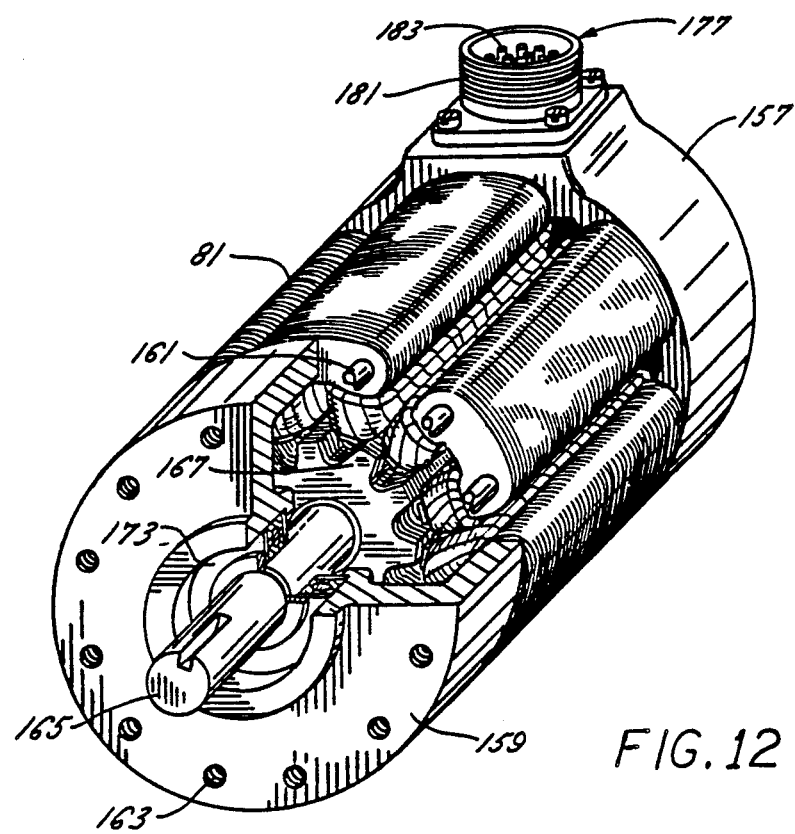
FIG. 12 is a perspective view of an assembly for a three-phase ECR motor incorporating the invention as illustrated in FIGS. 8a-8b, with part of an end bell cut away to expose the ends of the stator and rotor lamination stacks.
Figure 13:
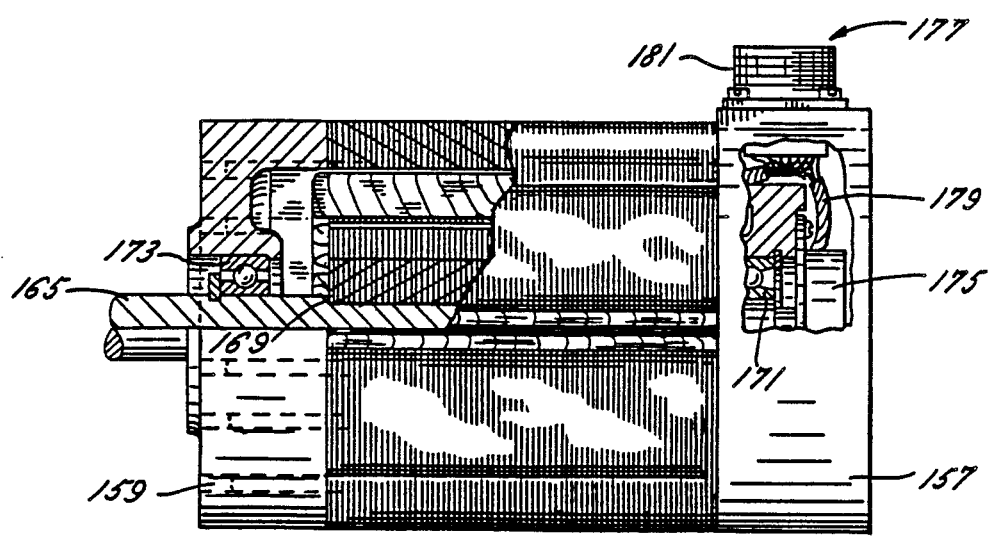
FIG. 13 is a side view of the three-phase ECR motor assembly of FIG. 11, with part of the stator and rotor laminations and an end bell cut away to expose the interior of the motor.

To form an exemplary motor according to the invention, the stator and rotor laminations are stacked to a length which gives the desired power rating. The laminations are composed of a magnetically permeable steel alloy such as nonoriented silicon steel (e.g., M15 or M19). A lamination construction is preferred because it significantly reduces eddy current losses. Such a construction is shown in FIGS. 12 and 13 where the stator stacks 81 from FIGS. 8a–8b are sandwiched between opposing motor end bells 157 and 159 and held together as a stator assembly by bolts 161 which pass through bores in the stacks 81 formed by the alignment of the holes 131 (see FIGS. 9a–9b) in each lamination and into threaded bores 163 in the end bells.

Except for the construction of the stator, the illustrated construction of a motor incorporating the invention is conventional. Specifically, a shaft 165 provides a mounting for the rotor laminations. The shaft 165 and stack of rotor laminations 167 are keyed in order that the laminations may be longtudinally aligned. To hold the rotor stack 167 together, one end of the stack is biased against an edge 169 formed by a transition in the diameter of the shaft 165. The second end of the rotor stack 167 is held in place by a conventional clamping mechanism (not shown).

Inside the end bells 157 and 159, bearing 171 and 173, respectively, receive journal portions of the rotor shaft 165. At one end, the shaft 165 extends past the bearing 173 in order to provide a drive output. A conventional position sensor 175 is coupled to the other end of the shaft 165. The position sensor 175 provides information regarding position of the rotor stack 167 to the electronic drive (not shown) in order for the drive to control commutation.

For delivering power to the windings 83 of the stator stacks 81, a receptacle 177 is provided on one side of the motor end bell 157. The receptable 177 couples a polyphase drive source (not shown) to the windings 83. Cabling 179 inside the motor end bell 157 physically and electrically joins the receptacle 177 to the windings 83 and the position sensor 175. In addition to providing an input port for a polyphase source, the receptacle 177 also serves as an output port for signals from the position sensor 175. In the illustrated embodiment, the receptacle 177 includes externally threaded skirts 181 for mating with a matched receptacle (not shown). Recessed inside the cylindrical skirt 181 of the receptacle 177 is a plurality of contact prongs 183 which plug into the mating receptacle.

The foregoing discussion regarding the structure of a motor according to the invention and its various modes of excitation is related to a rotary machine with the rotor inside the stator. Those skilled in the art of motor design will appreciate that the inventive concepts of the invention may be applied to other motor types such as "inverted" (i.e., stator inside the rotor) and linear motors. Exemplary inverted and linear motors incorporating the invention are illustrated in FIGS. 14 and 15, respectively.

Figure 14A:
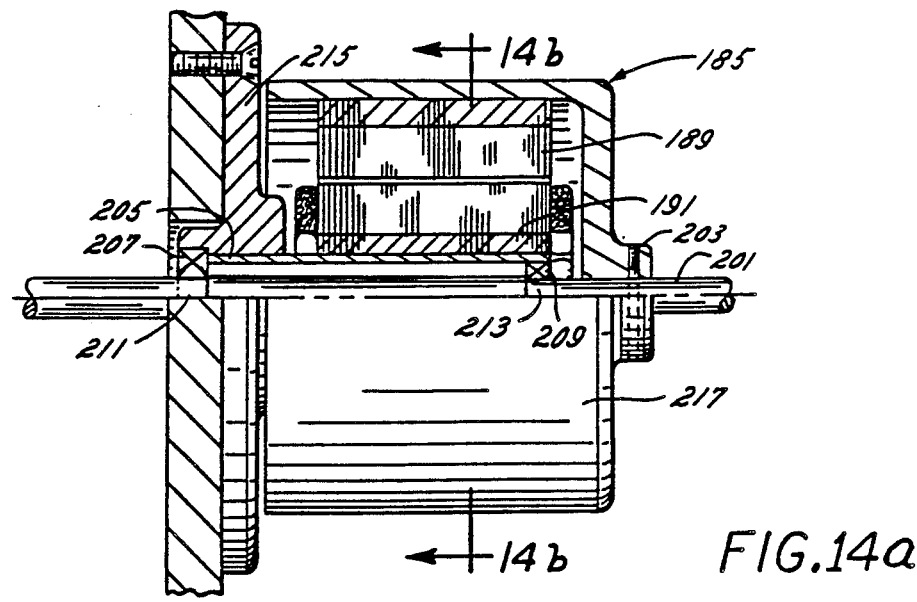
FIG. 14a is a side view of an exemplary "inverted" three-phase ECR motor incorporating the invention, partially shown in a cross-section taken along the length of the motor.
Figure 14B:
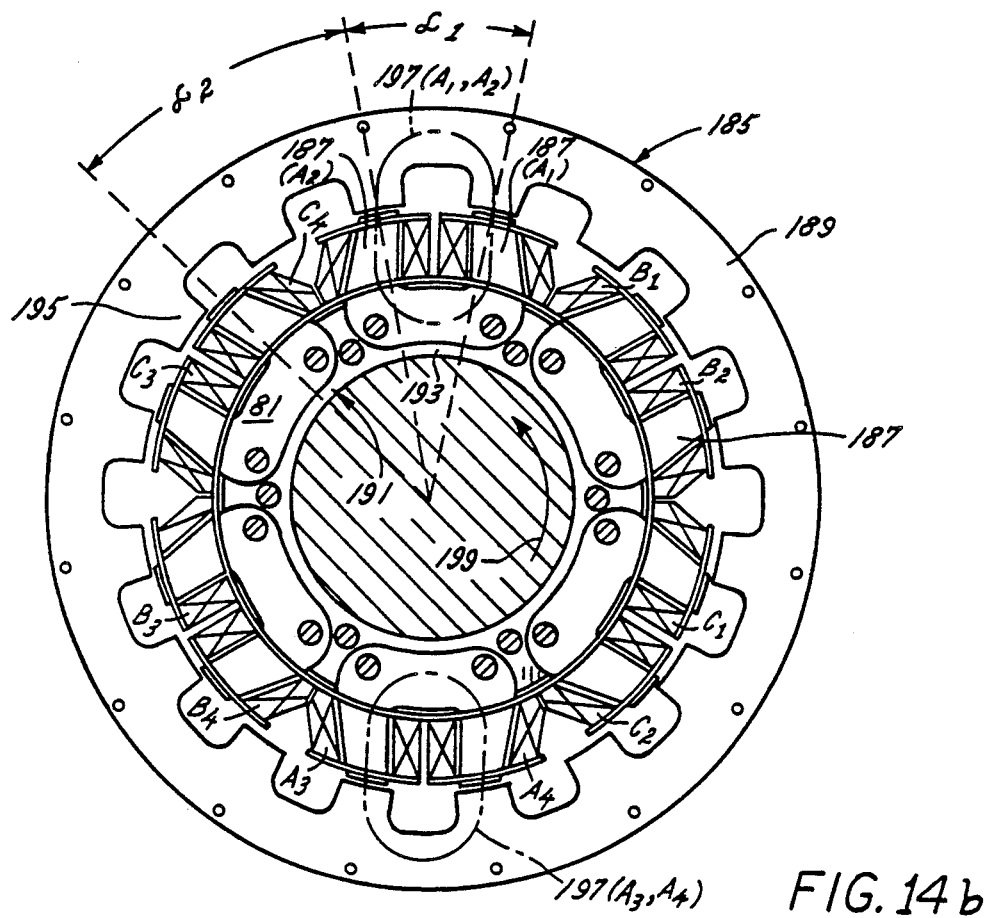
FIG. 14b is a transverse cross-sectional view of the "inverted" ECR motor taken along the line 14b-14b of FIG. 14a and effectively showing the configurations of a stator and rotor laminations according to the invention.
Figure 15:
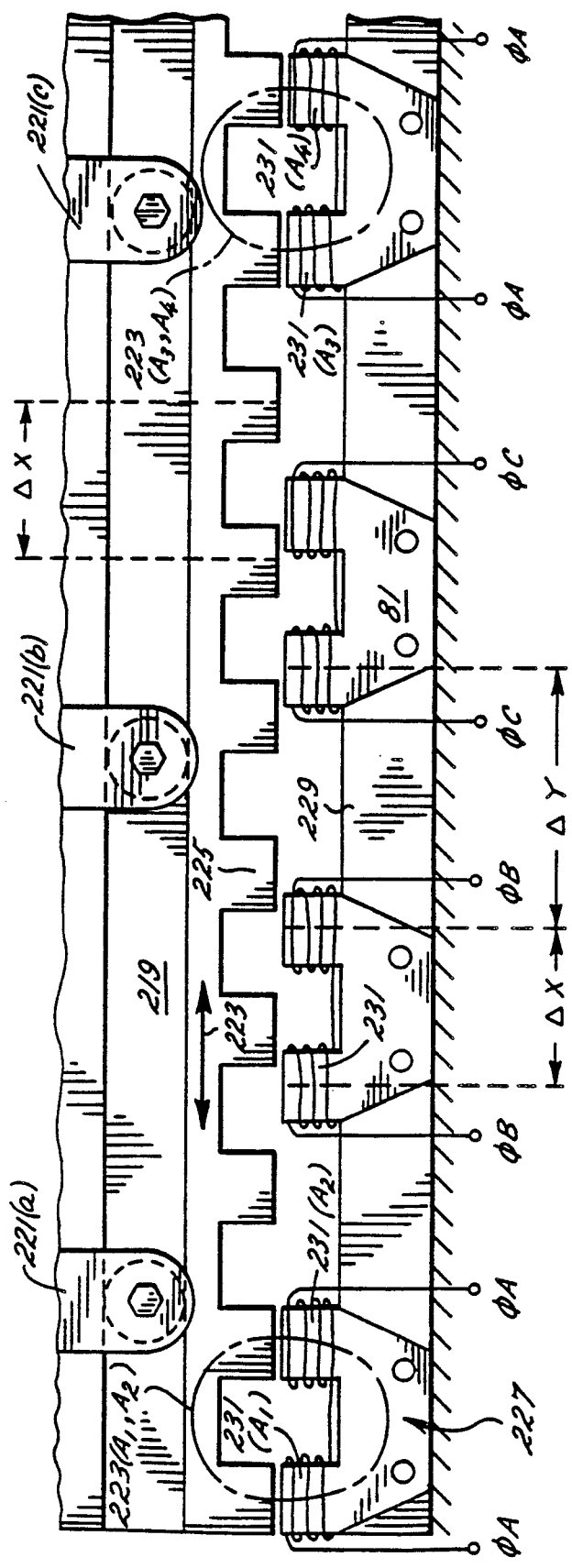
FIG. 15 is an illustration of an exemplary linear ECR motor incorporating the invention.

A simple three-phase inverted motor 185 is illustrated in FIGS. 14a and 14b where one pair of stator poles 187 is excited by each of the phases A, B and C. As is conventional in inverted motors, a rotor 189 is mounted for rotation about a stator 191. In accordance with the invention, each pair of stator poles is magnetically isolated from the other poles. To accomplish such isolation, the U-shaped stacks 81 of FIGS. 8a-8b are mounted on a base 193 composed of material having low magnetic permeability characteristics, e.g., aluminum or zinc. The stacks 81 can be bolted or doweled to or cast in place on the base 193. Other joining techniques known in the art may also be used, depending on the design considerations of the particular construction used.

In keeping with the invention, the poles 195 of the rotor 189 are separated by equal angles of $\alpha_1$ degrees, and the poles 187 of the stator 191 are circumferentially separated by alternating angles of $\alpha_1$ and $\alpha_2$ degrees. The two poles of a U-shaped stator stack 81 are separated by the angle $\alpha_1$, whereas adjacent poles of different pairs are separated by the angle $\alpha_2$.

Energization of the windings of each pair of stator poles generates a magnetic circuit such as the magnetic circuit 197 ($A_1$, $A_2$) and 197 ($A_3$, $A_4$) in FIG. 14b. Specifically, energization of phase A windings $A_1$-$A_4$ draws stator poles 187 ($A_1$) and 187 ($A_2$) of one U-shaped stack 81 into a low reluctance alignment with adjacent pairs of rotor poles 195. The second stack 81 carrying windings $A_3$ and $A_4$ is circumferentially positioned to align with rotor poles 195 simultaneously with the stator stack of windings $A_1$ and $A_2$. When the windings $B_1$-$B_4$ and $C_1$-$C_4$ of phases B and C, respectively, are excited, the same low reluctance alignment occurs between adjacent rotor poles and the stator pole pairs of the associated U-shaped stacks 81. Sequential application of phases A, B and C to the inverted motor rotates the rotor 189 in a counterclockwise direction as indicated by the arrow 199 in FIG. 14b.

In the illustrated embodiment of an inverted motor of FIG. 14a, the rotor 189 is keyed to a drive shaft 201 by a pin 203. The drive shaft 201 is mounted for rotation inside a hollow cylinder 205 by bearings 207 and 209 receiving journals 211 and 213, respectively. The outer surface of the hollow cylinder 205 provides a support surface for the stator 191. A reference surface 215 provides a base to which the hollow cylinder 205 is secured. As with the other illustrated motors, the rotor 189 and stator 191 are preferably formed by a plurality of laminations. The outer perimeter of the rotor 189 is a casing 217 for supporting the laminations of the rotor. The laminations of the rotor 189, may be formed by a plurality of separate thin metal sheets or they may alternatively be formed by a single continuous thin metal sheet rolled edgewise as set forth in U.S. Pat. Nos. 4,356,377, 4,622,835 and 4,643,012, assigned to General Electric Company.

As will be appreciated by those skilled in the art of motor design, the inverted motor of FIGS. 14a-14b may be operated as a starter/generator. For example, in a vehicle powered by a prime mover such as a gasoline or diesel engine, the inverted motor may be placed in the drive train for the purpose of operating as a starter when energized in a motoring mode. With the prime mover started, it drives the rotor 189 which acts as a flywheel. By energizing the stator windings when inductance between pole pairs is high (the reverse of motoring energization—see FIG. 3), a net positive current flow can be achieved from the windings so that the electromagnetic structure of FIGS. 14a-14b operates as a generator. Applicants believe the novel construction of the invention results in an output current characterized by less ripple than generators formed by conventional variable reluctance structure.

For a linear motor incorporating the invention, FIG. 15 illustrates a rack 219 mounted to roller assemblies 221(a), 221(b) and 221(c) for bi-directional movement as indicated by arrow 223. The rack 219 includes evenly spaced poles 225 separated by a distance $\Delta X$, and a stator 227 includes unevenly spaced poles separated by alternating distances of $\Delta X$ and $\Delta Y$. As with the relationship between angles $\alpha_1$ and $\alpha_2$ in the illustrated rotary motors, $\Delta X$ and $\Delta Y$ are unequal and are not integer multiples of one another. In the illustrated embodiment $\Delta Y$ is 5/3 of $\Delta X$.

In keeping with the invention, the stator 227 is not a continuous member composed of the same high reluctance material; instead, high reluctance material 229 separates the pairs of adjacent poles, each of which is energized by one of the pairs of windings ($A_1$, $A_2$), ($B_1$, $B_2$), ($C_1$, $C_2$) and ($A_3$, $A_4$) as illustrated. The stator assembly in the illustrated embodiment is supported on a non-magnetic base and is composed of a plurality of the U-shaped stacks 81 sections illustrated in FIGS. 8a-8b, each defining a pair of poles spaced by a distance $\Delta X$. Adjacent U-shaped stacks 81 are spaced so that neighboring poles of different stacks are separated by the distance $\Delta Y$. The spatial gaps between the U-shaped stacks 81 are filled by the low reluctance material 229, such as an epoxy resin, to ensure structural integrity. With the foregoing construction, flux generated by each stator pole 231 is confined in the back iron area of each U-shaped stack 81. Direct magnetic coupling between sections through the stator back iron is prevented by the low reluctance barriers between stacks.

As with the other three-phase embodiments of the invention illustrated herein, the linear motor of FIG. 14 may be energized by a one-phase-on, two-phase-on or hybrid scheme. A one-phase-on scheme is illustrated in FIG. 15 with phase A energizing windings $A_1$, $A_2$, $A_3$ and $A_4$. As the illustration indicates, the stator 227 and rack 219 may be made as long as necessary for the application. Therefore, more than the four windings $A_1$, $A_2$, $A_3$ and $A_4$ may be energized by phase A, depending upon the application and associated power requirements. With phase A energized, magnetic circuits 233 ($A_1$, $A_2$) and 233 ($A_3$, $A_4$) are formed between the adjacent stator poles 231 ($A_1$), 231 ($A_2$) and 231 ($A_3$), 231 ($A_4$), respectively. Adjacent pairs of poles 225 on the rack 219 are drawn into a low reluctance alignment with the energized pairs of stator poles 231, thereby causing linear movement of the rack. By chosing different sequences of phase excitation of the windings, the direction of movement by the rack 219 may be controlled.

Various embodiments of motors incorporating the invention have been illustrated herein. From an understanding of the illustrated embodiments, other variations will be apparent to those skilled in motor design. The important principle of all the various designs is the magnetic isolation of pairs of adjacent poles in the stator having opposing polarities, each pair being energized to form a magnetic circuit between the teeth of the pair. By providing uneven spacing between adjacent poles of different pairs, rotation of such a motor is assured and control may be had regarding direction of motor movement.

We claim:

1. A method of constructing a stator for a motor comprising the steps of:
   cutting a plurality of U-shaped laminations from sheets of material characterized by high magnetic permeability;
   stacking said plurality of U-shaped laminations to form a pair of poles;
   winding insulated wire of a single phase about said pair of poles of said stacked U-shaped laminations such that energization of said windings forms magnetic poles of opposing polarity; and
   repeating the foregoing steps for each phase of said motor and assembling the stacks of U-shaped laminations into an annular configuration that defines an annular spacing $\alpha_2$ between adjacent poles of different pairs and an angular spacing $\alpha_1$ between poles of the same pair, where the value of $\alpha_1$ does not equal the value of $\alpha_2$.

2. A method as set forth in claim 1 where the step of assembling the stacks of U-shaped laminations includes separating each stack from an adjacent stack by the angular spacing $\alpha_2$ measured from a proximate center of the annular configuration where the angular spacing $\alpha_2$ is linearly related to the numbers of stator poles and the number of poles of a complementary rotor.

3. A method as set forth in claim 2 where the step of assembling the stacks of U-shaped laminations includes filling the angular spacings $\alpha_1$ and $\alpha_2$ with material of low magnetic permeability.

4. A method of constructing a stator for a motor powered by a polyphase source, the method comprising the steps of:
   cutting a plurality of U-shaped laminations from sheets of material characterized by high magnetic permeability, each lamination has substantially the same dimensions as the others;
   stacking the plurality of U-shaped laminations one upon another to form a stack wherein the edges of each lamination are substantially aligned with the edges of the other laminations in the stack;
   winding about the stack insulating wire of a single phase of the polyphase such that energization of the windings forms adjacent salient poles of opposing magnetic polarity; and
   repeating the foregoing steps for each phase of the polyphase source and assembling the resulting stacks into a predetermined configuration that complements the shape of a rotor of the motor such that the spacing between adjacent salient poles of different stacks is not equal to the spacing between the pair of poles formed by any one of the stacks.

* * * * *